United States Patent
Gotoh et al.

(10) Patent No.: US 10,048,817 B2
(45) Date of Patent: Aug. 14, 2018

(54) TOUCH CONTROL METHOD, TOUCH CONTROL DEVICE AND DISPLAY DEVICE HAVING TOUCH DETECTION FUNCTION

(71) Applicant: Japan Display Inc., Minato-ku (JP)

(72) Inventors: Fumitaka Gotoh, Tokyo (JP); Hiroshi Mizuhashi, Tokyo (JP); Hayato Kurasawa, Tokyo (JP); Yoshitoshi Kida, Tokyo (JP)

(73) Assignee: Japan Display Inc., Minato-ku (JP)

( * ) Notice: Subject to any disclaimer, the term of this patent is extended or adjusted under 35 U.S.C. 154(b) by 172 days.

(21) Appl. No.: 15/096,874

(22) Filed: Apr. 12, 2016

(65) Prior Publication Data

US 2016/0306466 A1 Oct. 20, 2016

(30) Foreign Application Priority Data

Apr. 17, 2015 (JP) .................................. 2015-085174

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC .................................. G06F 3/044; G06F 3/0416
See application file for complete search history.

(56) References Cited

U.S. PATENT DOCUMENTS

| 9,007,342 | B2* | 4/2015 | Grivna | G06F 3/0416 |
| | | | | 345/173 |
| 2009/0256818 | A1* | 10/2009 | Noguchi | G02F 1/13338 |
| | | | | 345/174 |
| 2010/0182273 | A1* | 7/2010 | Noguchi | G02F 1/13338 |
| | | | | 345/174 |
| 2012/0242612 | A1* | 9/2012 | Chang | G06F 3/0416 |
| | | | | 345/174 |
| 2015/0103047 | A1* | 4/2015 | Hanauer | G06F 3/0416 |
| | | | | 345/174 |

FOREIGN PATENT DOCUMENTS

| JP | 2009-244958 | 10/2009 |
| JP | 2009-258182 | 11/2009 |
| JP | 2012-198884 | 10/2012 |

* cited by examiner

*Primary Examiner* — Andrew Sasinowski
(74) *Attorney, Agent, or Firm* — Oblon, McClelland, Maier & Neustadt, L.L.P.

(57) ABSTRACT

According to one embodiment, a touch control method of a touch control device which drives a touch sensor to collect data indicating a position of at least one object to be detected, and outputs the data to an external device, the touch sensor having plural first electrodes arranged to extend a first direction, and plural second electrodes arranged to extend in a second direction crossing the first direction, the touch control method includes driving the first electrodes in a self-detection mode to specify at least one of the first electrodes which detects the object, and driving the specified at least one first electrode and the second electrodes in a partial mutual detection mode to collect data indicating the position of the object.

6 Claims, 16 Drawing Sheets

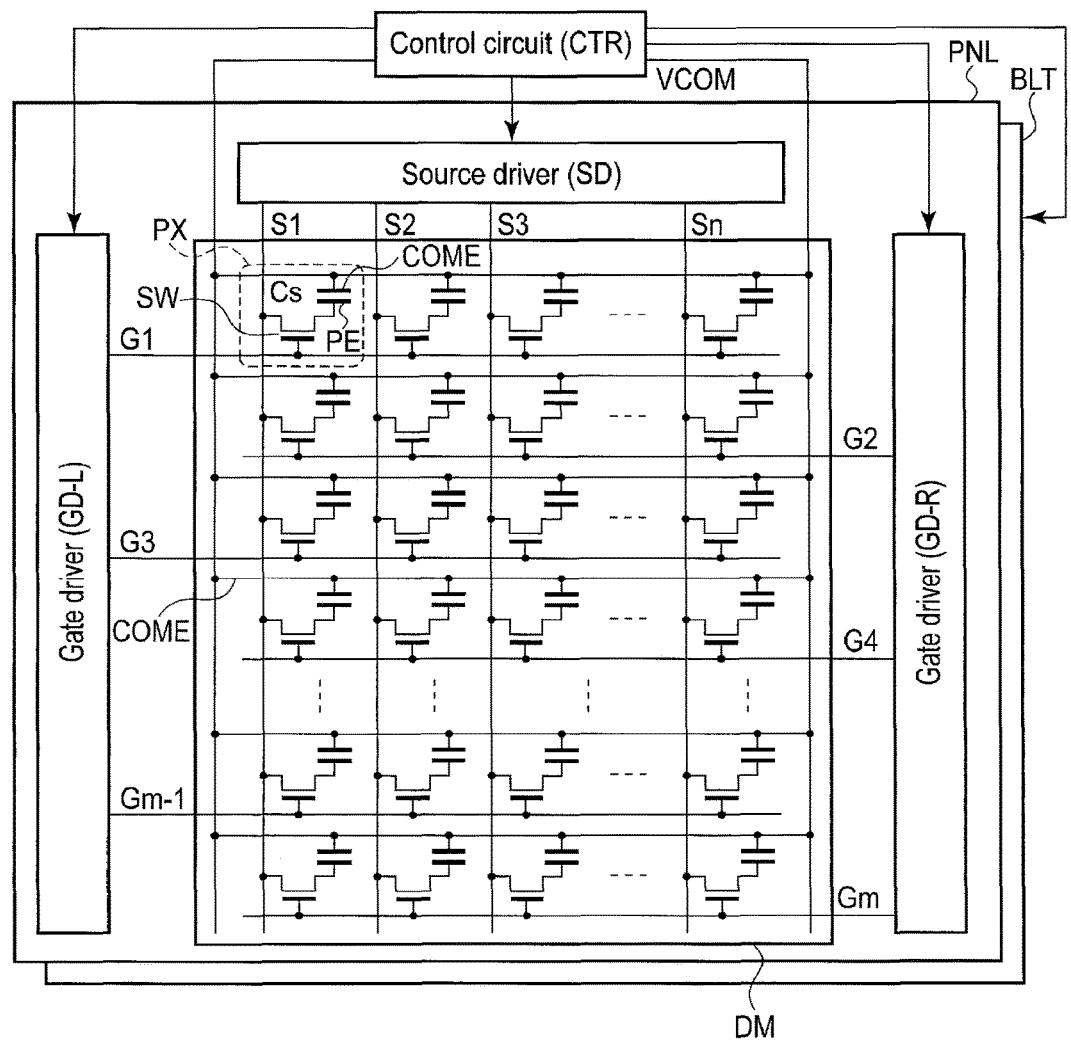
F I G. 1

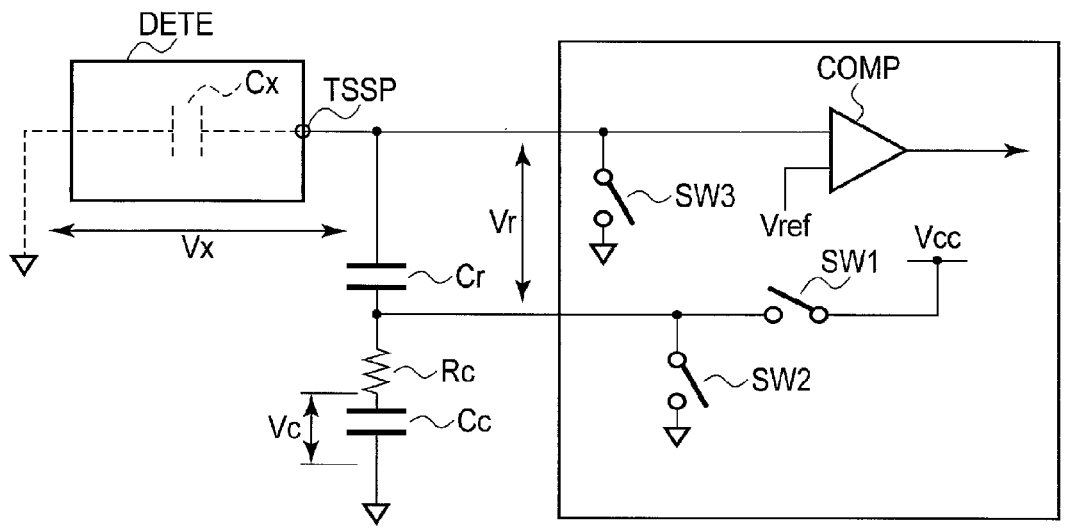
F I G. 5
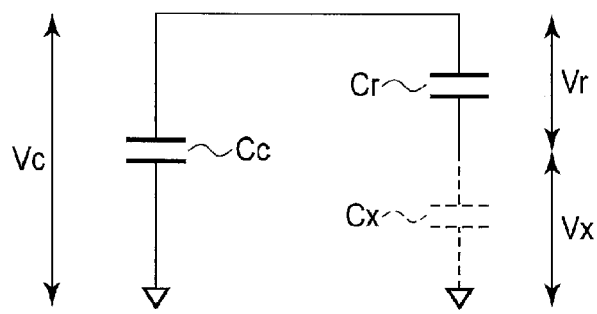
F I G. 6

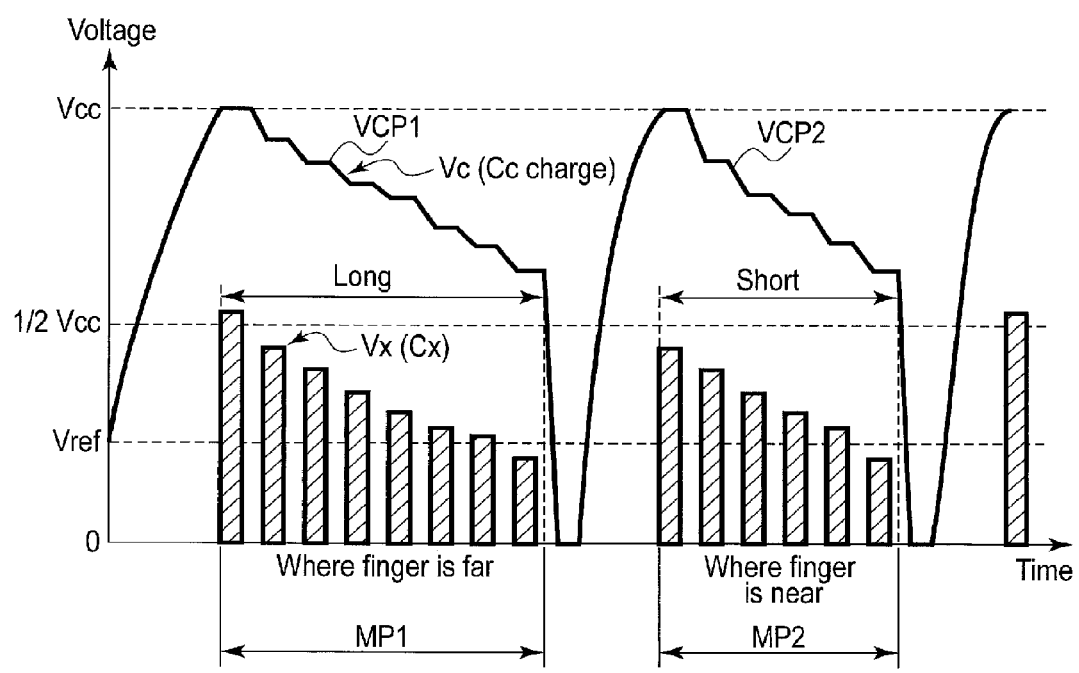
F I G. 7

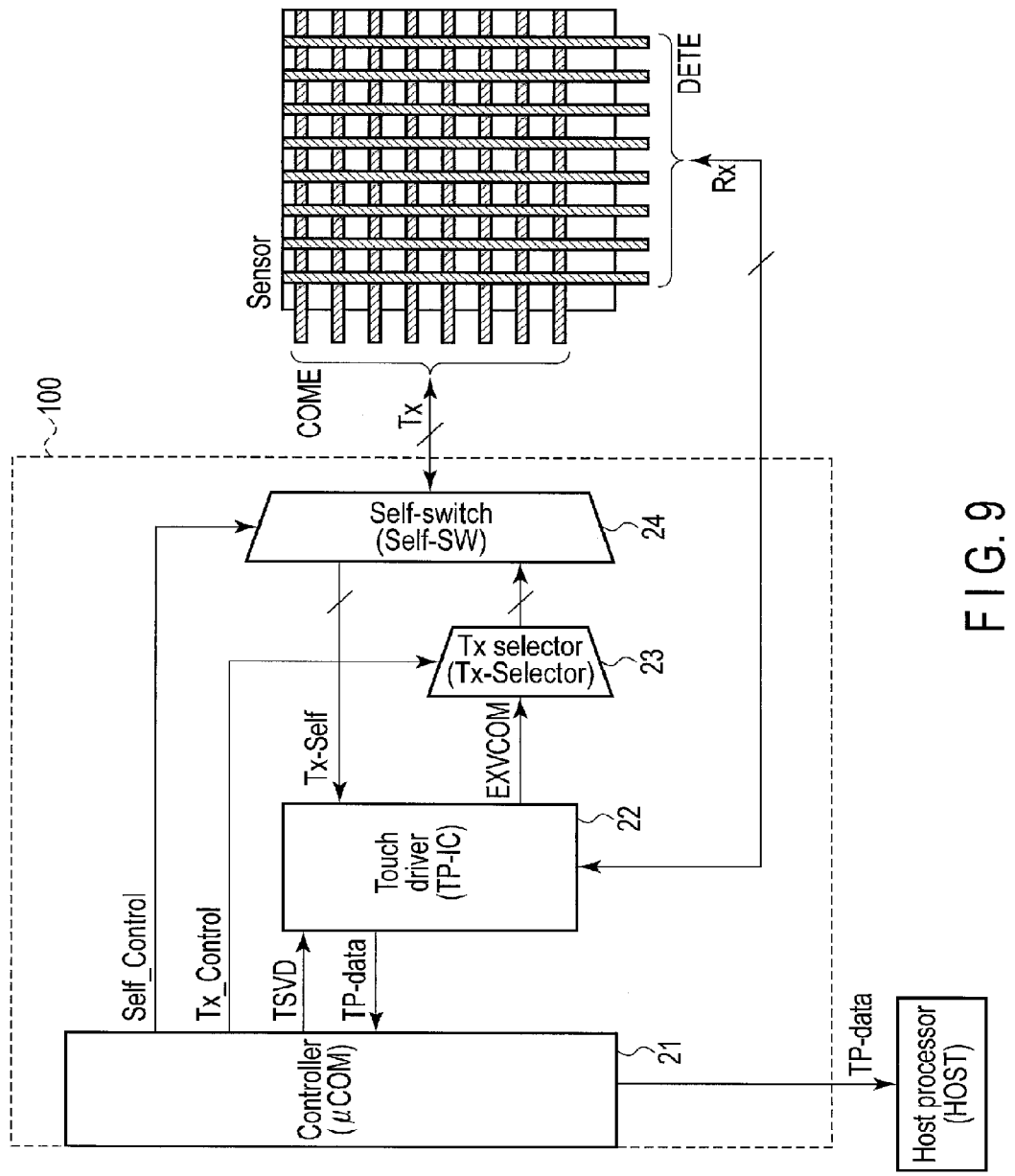
F I G. 9

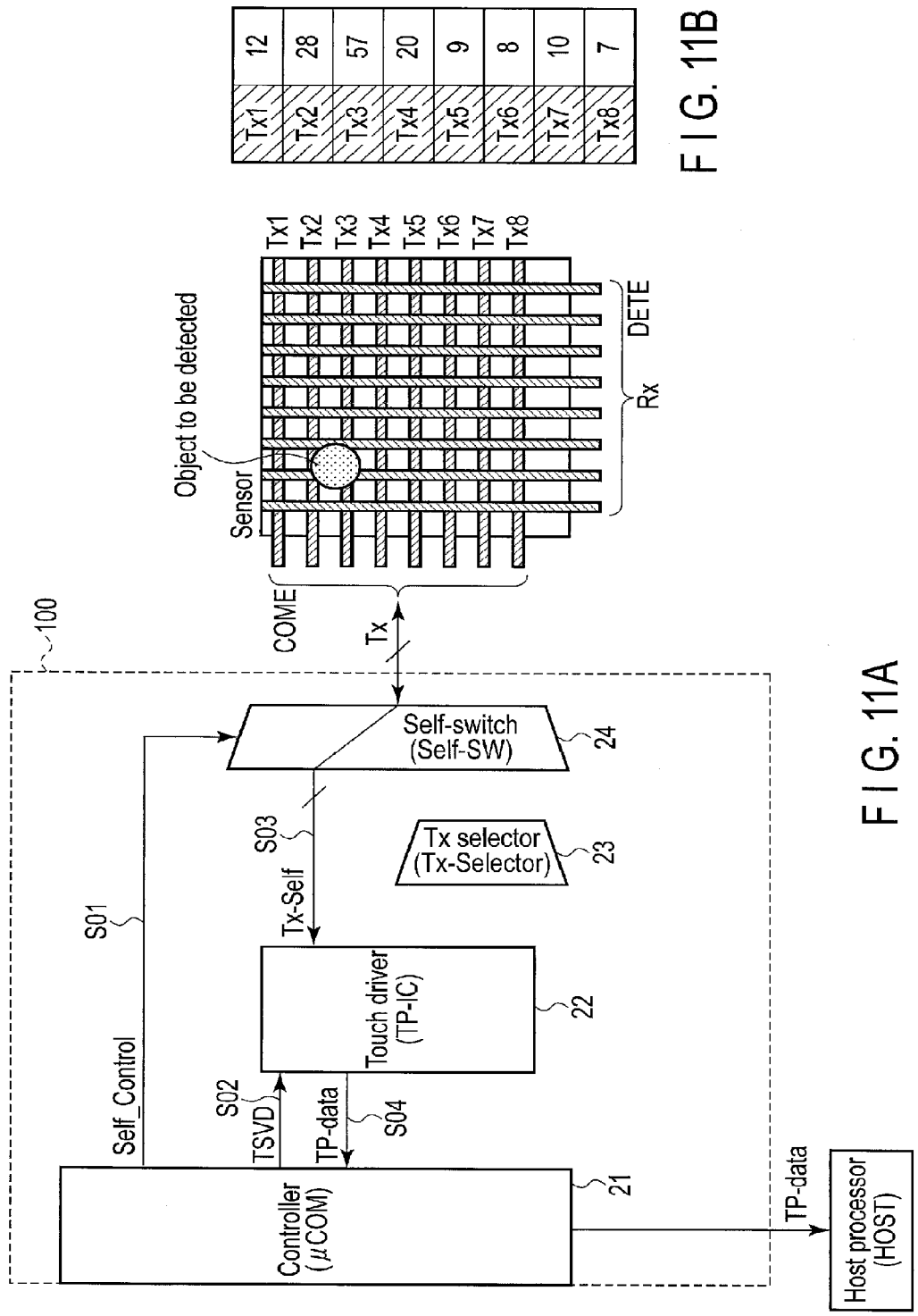
F I G. 11A
F I G. 11B

| 22 | 60 | 44 | 28 | 15 | 9 | 12 | 11 |
|----|----|----|----|----|----|----|----|
| Rx1 | Rx2 | Rx3 | Rx4 | Rx5 | Rx6 | Rx7 | Rx8 |

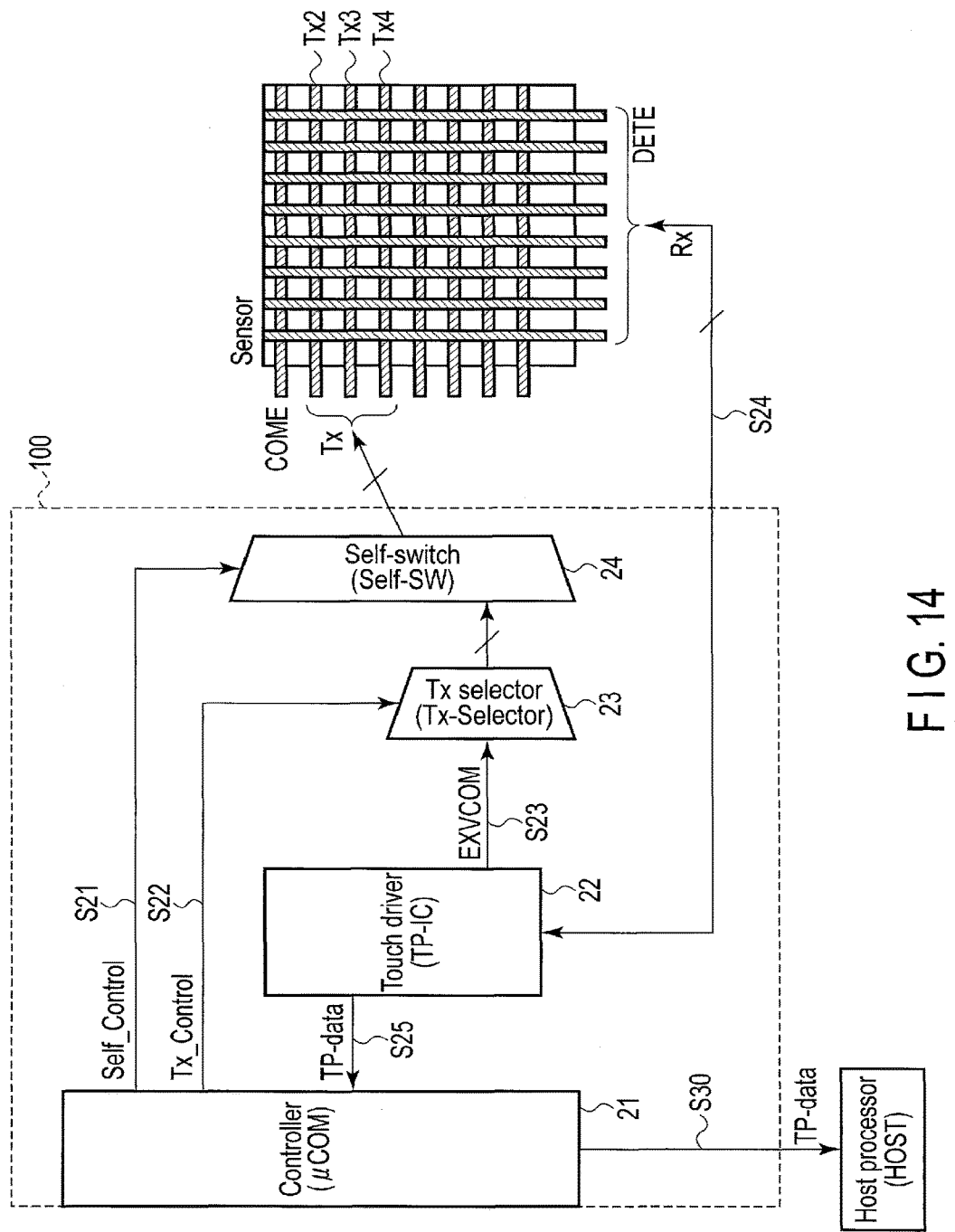
F I G. 14

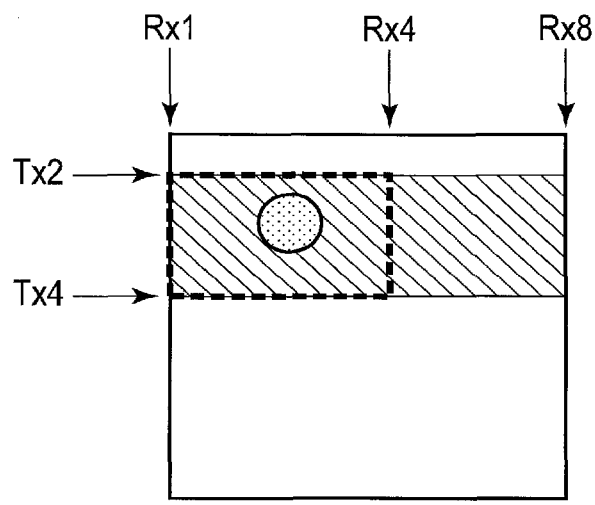
F I G. 15A
| 22 | 60 | 44 | 28 | 15 | 9 | 12 | 11 |
|---|---|---|---|---|---|---|---|
| Rx1 | Rx2 | Rx3 | Rx4 | Rx5 | Rx6 | Rx7 | Rx8 |
F I G. 15B

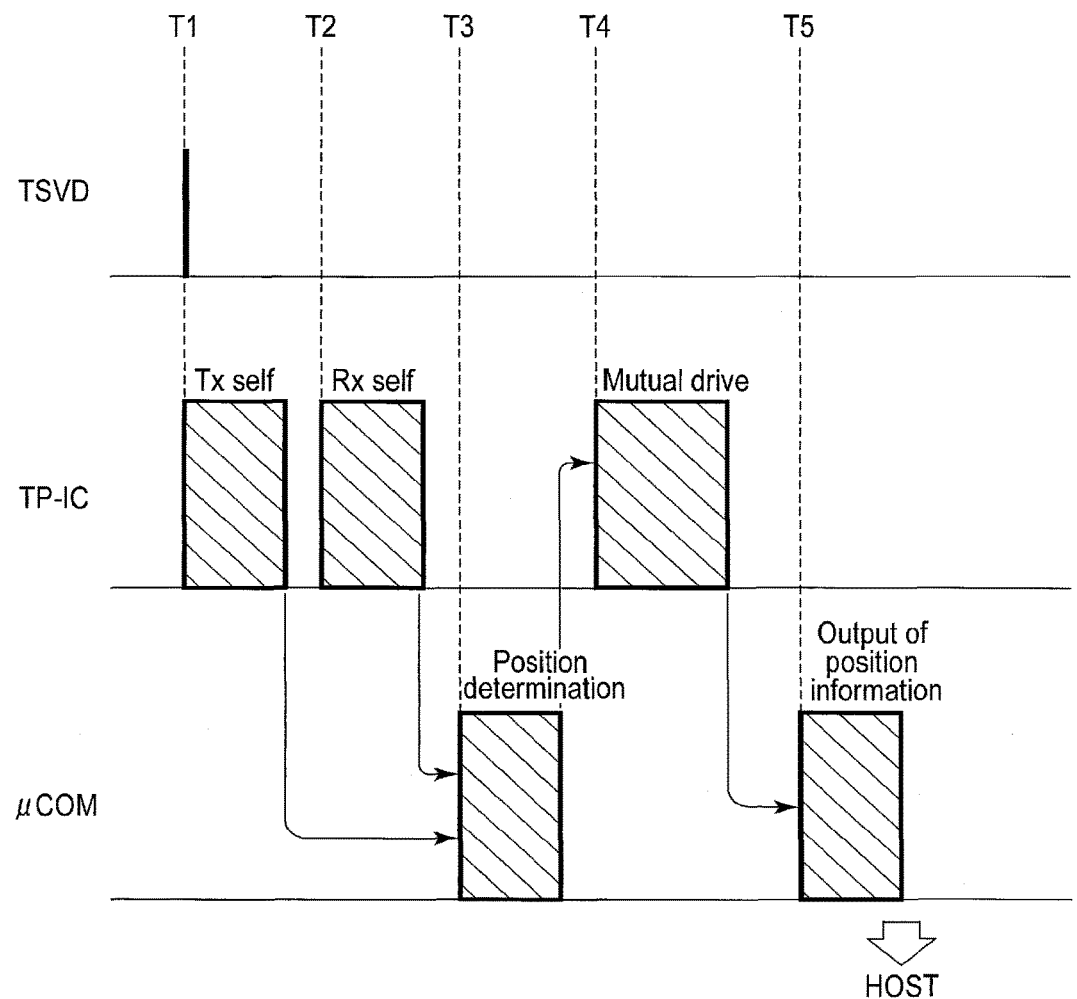
F I G. 16

TOUCH CONTROL METHOD, TOUCH CONTROL DEVICE AND DISPLAY DEVICE HAVING TOUCH DETECTION FUNCTION

CROSS-REFERENCE TO RELATED APPLICATIONS

This application is based upon and claims the benefit of priority from Japanese Patent Application No. 2015-085174, filed Apr. 17, 2015, the entire contents of which are incorporated herein by reference.

FIELD

Embodiments described herein relate generally to a touch control method, a touch control device and a display device having a touch detection function.

BACKGROUND

In recent years, attention has been given to display devices in which a touch detection device referred to as a so-called touch panel is provided on a display device such as a liquid crystal display device, or a touch panel and a display device are integrated into a single unit, and the display device is made to display various button images to enable information to be input without ordinary real buttons. Such display devices having a touch detection function do not need input devices such as a keyboard, a mouse and a keypad, and thus tend to be broadly used as display devices of computers, portable information terminals such as cell phones, etc.

As such a touch panel, a capacitive touch panel is known in which plural electrodes extending in a direction are arranged to intersect plural electrodes extending in another direction. In this type of touch panel, the electrodes are connected to a control circuit, and are supplied by the control circuit with an excitation current to detect closely situated external object.

As a display device having a touch detection function, a so-called in-cell touch panel is proposed in addition to a so-called on-cell display device in which a touch panel is provided on a display surface of the display device. In the in-cell display device, common electrodes for display, which are originally provided in the display device, are also used as one of a pair of groups of electrodes for a touch sensor, and the other group of electrodes is provided to intersect the common electrodes.

Furthermore, as a mode for detecting a touch position, a mutual detection mode and a self-detection mode are known. In the mutual detection mode, an AC drive signal is supplied to one of a pair of groups of electrodes, and detection signals generated at the other group of electrodes are processed, to thereby detect a touch position. In the self-detection mode, an AC drive signal is supplied to one of a pair of groups of electrodes, and a signal generated to the above one of the pair of groups of electrodes is processed, thereby detecting a touch position.

It should be noted that in the in-cell display device having a touch detection function, each frame time period is divided into a time period in which an image is displayed (image display time period) and a time period in which a touch position is detected (touch detection period). Because of such a technical feature, in recent years, in the case where display devices are made to have a larger size and a higher definition, and their touch panels are made to have a higher resolution, there is a risk that the following problems will arise:

(1) As the touch detection period increases, the display time period decreases. Inevitably, the display quality is reduced. Also, as a touch drive frequency increases, the power consumption of the display device having a touch detection function increases.

(2) If the amount of touch data to be processed increases, there is a case where a delay is caused in touch data processing including a touch data transfer. Also, as the number of touch sensors increases, the power consumption of the display device having a touch detection function increases.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view schematically showing a configuration of a display device having a touch detection function according to a first embodiment.

FIG. 5 is an exemplary view showing an example of a basic circuit for achieving the self-detection mode in the display device having the touch detection function according to the first embodiment.

FIG. 6 is an exemplary view showing an equivalent circuit in the case where switches in the display device having the touch detection function according to the first embodiment are turned on and off.

FIG. 7 is an exemplary view showing a variation waveform of the voltage of a capacitor and an output waveform of a comparator in the display device having the touch detection function according to the first embodiment.

FIG. 9 is an exemplary view showing a configuration of a touch control device which is related to a detection operation and a touch drive operation of the display device having the touch detection function according to the first embodiment.

FIG. 11A is an exemplary view for explaining a transmission-electrode self-detection operation of the touch control device according to the first embodiment.

FIG. 11B is another exemplary view for explaining the transmission-electrode self-detection operation of the touch control device according to the first embodiment.

FIG. 14 is an exemplary view for explaining a mutual drive operation of the touch control device according to the first embodiment.

FIG. 15A is an exemplary view for explaining a position information output operation of the touch control device according to the first embodiment.

FIG. 15B is another exemplary view for explaining the position information output operation of the touch control device according to the first embodiment.

FIG. 16 is exemplary time chart for explaining a touch control operation of the touch control device according to the first embodiment.

DETAILED DESCRIPTION

Figure 2:
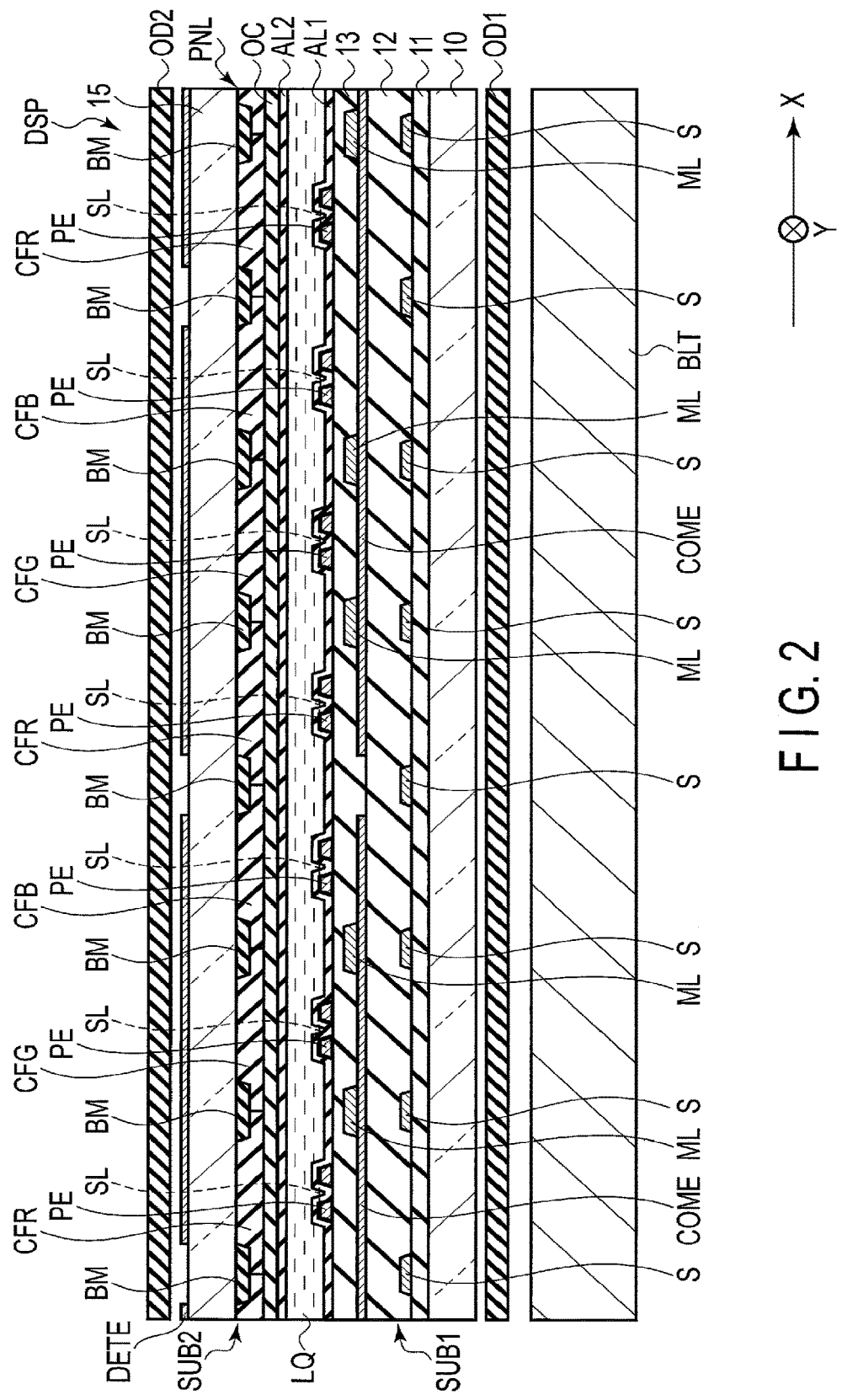
FIG. 2 is an exemplary cross-sectional view showing in further detail the configuration of the display device having the touch detection function according to the first embodiment.

Various embodiments will be described hereinafter with reference to the accompanying drawings.

In general, according to one embodiment, a touch control method of a touch control device which drives a touch sensor to collect data indicating a position of at least one object to be detected, which is located on or close to the touch sensor, and outputs the data to an external device, the touch sensor comprising plural first electrodes arranged to extend a first direction, and plural second electrodes arranged to extend in a second direction crossing the first direction in which the first electrodes extend, the touch control method comprising:

driving the first electrodes in a self-detection mode to specify at least one of the first electrodes which detects the object; and driving the specified at least one first electrode and the second electrodes in a partial mutual detection mode to collect data indicating the position of the object located on or close to the touch sensor.

Embodiments will be explained with reference to accompanying drawings.

The disclosure is a mere example, and arbitrary change of gist which can be easily conceived by a person of ordinary skill in the art naturally falls within the inventive scope. To better clarify the explanations, the drawings may pictorially show width, thickness, shape, etc. of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

First Embodiment

FIG. 1 is an exemplary view schematically showing a configuration of a display device DSP having a touch detection function according to a first embodiment. In the first embodiment, the display device is a liquid crystal display device. In the following, "touch detection" is used as a term which means not only that it is detected that a finger or the like touches a touch panel, but that it is detected that a finger or like is in proximity to the touch panel.

The display device DSP comprises a display panel PNL and a backlight BLT which illuminates the display panel PNL from a rear surface side thereof. In the display panel PNL, a display portion DM including display pixels PX arranged in a matrix is provided.

As shown in FIG. 1, the display portion DM includes: scanning lines G (G1, G2, ...) extending along plural rows of display pixels PX; source lines S (S1, S2, ...) extending along plural columns of display pixels PX; and pixel switches provided close to intersections of the scanning lines G and the source lines S.

The pixel switches SW include thin-film transistors (TFTs). A gate electrode of each of the pixel switches SW is electrically connected to an associated scanning line G. A source electrode of each pixel switch SW is electrically connected to an associated source line S. A drain electrode of each pixel switch SW is electrically connected to an associated pixel electrode PE.

Furthermore, as drive means for driving the plural display pixels PX, gate drivers GD (left gate driver GD-L and right gate driver GD-R) and a source driver SD are provided. The scanning lines G are electrically connected to output terminals of the gate drivers GD. The source lines S are electrically connected to output terminals of the source driver SD.

The gate drivers GD and the source driver SD are provided in an area (frame) surrounding the display portion DM. The gate drivers GD apply on-voltages to the scanning lines G successively, and then to the gate electrode of a pixel switch SW electrically connected to a selected scanning line G, an on-voltage for turning on the pixel switch SW is applied. In the pixel switch SW including the gate electrode to which the on-voltage is applied, the source electrode and the gate electrode are made conductive with each other. The source driver SD supplies output signals to the source lines S, respectively. Through the pixel switch SW whose source and drain electrodes are made conductive with each other, an associated pixel electrode PE is supplied with the signal from an associated source line S.

The operations of the gate drivers GD and the source driver SD are controlled by a control circuit CTR provided outside the display panel PNL. Furthermore, the control circuit CTR applies a common voltage Vcom to a common electrode COME to be described later. Also, the control circuit CTR controls the operation of the backlight BLT.

FIG. 2 is an exemplary cross-sectional view showing in further detail the configuration of the display device DSP having the touch detection function according to the first embodiment.

The display device DSP having the touch detection function comprises the display panel PNL, the backlight ELT, a first optical element OD1 and a second optical element OD2. In the example shown in FIG. 2, the display panel PNL is a liquid crystal display panel; however, it may be another type of flat panel such as an organic electroluminescent display panel. Also, although the display panel PNL as shown in FIG. 2 has a structure adapted for a lateral-electric-field mode applied as a display mode, it may have a structure adapted for another display mode.

The display panel PNL comprises a first substrate SUB1, a second substrate SUB2 and a liquid crystal layer LQ. The first substrate SUB1 and the second substrate SUB2 are attached to each other, with a predetermined space (cell gap) provided between them. The liquid crystal layer LQ is held in the cell gap between the first substrate SUB1 and the second substrate SUB2.

The first substrate SUB1 is formed using a first insulating substrate 10 having optical transparency, such as a glass substrate or a resin substrate. The first substrate SUB1 comprises, on a side of the first insulating substrate 10 which faces the second substrate SUB2, the source lines S, the common electrode COME, the pixel electrodes PE, a first insulating film 11, a second insulating film 12, a third insulating film 13, a first alignment film AL1, etc.

It should be noted that the pixel electrodes PE and the common electrode COME form, along with pixel areas of the liquid crystal layer LQ, display pixels which are arranged in a matrix in the display panel PNL.

The first insulating film 11 is provided on the first insulating substrate 10. Although it is not described in detail, the gate lines G, gate electrodes and semiconductor layers of the pixel switches SW, etc., are provided between the first insulating substrate 10 and the first insulating film 11. The source lines S are formed on the first insulating film 11. Also, the source electrodes, drain electrodes, etc., of the pixel switches SW are formed on the first insulating film 11. In the example shown in FIG. 2, the source lines S extend in parallel with the common electrode COME in a second direction Y.

The second insulating film 12 is provided on the source lines S and the first insulating film 11. The common electrode COME is formed on the second insulating film 12. In the example shown in FIG. 2, the common electrode COME comprises a plurality of segments. The segments of the common electrode COME extend in the second direction Y, and are arranged apart from each other in the first direction X. The common electrode COME is formed of a transparent conductive material such as indium tin oxide (ITO) or indium zinc oxide (IZO) and so on. It should be noted that in the example shown in FIG. 2, metal layers ML are formed on the common electrode COME and contact the common electrode, reducing the resistance of the common electrode COME. However, the metal layers ML may be omitted.

The third insulating film 13 is provided on the common electrode COME, the metal layers ML and the second insulating film 12. The pixel electrodes PE are formed on the third insulating film 13. Each of the pixel electrodes PE is located between associated adjacent source lines S, and opposite to the common electrode COME. Furthermore, each pixel electrode PE includes at least one slit SL located opposite to the common electrode COME. The pixel electrodes PE are formed of a transparent conductive material such as ITO or IZO. The first alignment film AL1 covers the pixel electrodes PE and the third insulating film 13.

On the other hand, the second substrate SUB2 is formed using a second insulating substrate 15 having optical transparency, such as a glass substrate or a resin substrate. The second substrate SUB2 comprises a black matrix BM, color filters CFR, CFG, and CFB, an overcoat layer OC, a second alignment film AL2, etc., on a side of the second insulating substrate 15, which is opposed to the first substrate SUB1.

The black matrix BM is formed on an inner surface of the second insulating substrate 15, and defines each of the pixels. The color filters CFR, CFG and CFB are formed on the inner surface of the second insulating substrate 15, and partially stacked on the black matrix BM. The color filter CFR is a red filter; the color filter CFG is a green filter; and the color filter CFB is a blue filter. The overcoat layer OC covers the color filters CFR, CFG and, CFB. Also, the overcoat layer OC is formed of a transparent resin material. The second alignment film AL2 covers the overcoat layer OC.

A detection electrode DETE is formed on an outer surface of the second insulating substrate 15. Although the detection electrode DETE is divided into stripes, it is simplified in FIG. 2, and leads are not shown therein. A detailed structure of the detection electrode DETE will be described later. The detection electrode DETE is formed of a transparent conductive material such as ITO or IZO.

The backlight BLT is provided on a rear surface side of the display panel PNL. As the backlight BLT, various kinds of backlights can be applied, such as a backlight using a light-emitting diode (LED) as a light source and a backlight using a cold-cathode fluorescent lamp (CCFL) as a light source. A detailed explanation of the structure of the backlight BL will be omitted.

The first optical element OD1 is located between the first insulating substrate 10 and the backlight BLT. The second optical element OD2 is provided on the detection electrode DETE. Each of the first optical element OD1 and the second optical element OD2 includes at least a polarizer, and may include a retardation film, if necessary.

A touch sensor for use in the display device DSP having the touch detection function according to the first embodiment will be explained. As methods of detecting that a user's finger or a pen is in contact with or proximity to the touch panel, a self-detection mode and a mutual detection mode are present. The principles of these detection modes will be explained.

<Self-Detection Mode>

FIGS. 3A, 3B, 4A and 4B are exemplary views for explaining the principle of a self-detection mode in the display device DSP having the touch detection function according to the first embodiment.

Figure 3A:
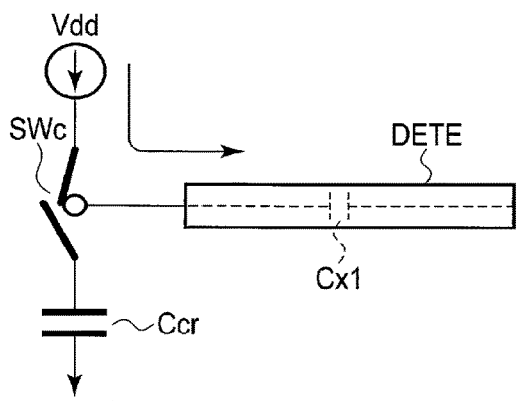
FIG. 3A is an exemplary view showing a principle of a self-detection mode in the display device having the touch detection function according to the first embodiment.
Figure 3B:
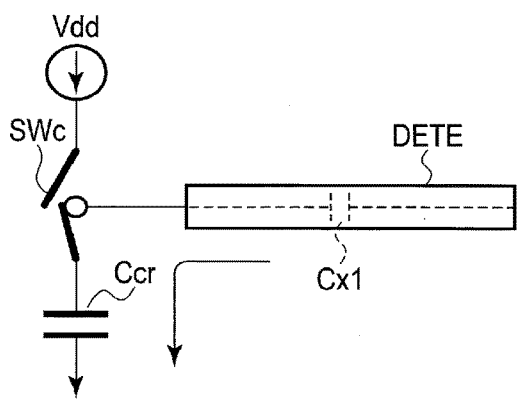
FIG. 3B is another exemplary view showing the principle of the self-detection mode in the display device having the touch detection function according to the first embodiment.

FIGS. 3A and 3B show states in which the touch panel is not touched by a user's finger. To be more specific, FIG. 3A shows a state that a power supply Vdd and a detection electrode DETE are connected to each other by a control switch SWc, and the detection electrode DETE is not connected to a capacitor Ccr. In this state, the detection electrode DETE, which has capacitance Cx1, is charged. FIG. 3B shows a state in which by the control switch SWc, the power supply Vdd and the detection electrode DETE are disconnected from each other, and the detection electrode DETE and the capacitor Ccr are connected to each other. In this state, the detection electrode DETE having capacitance Cx1 is discharged through the capacitor Ccr.

Figure 4A:
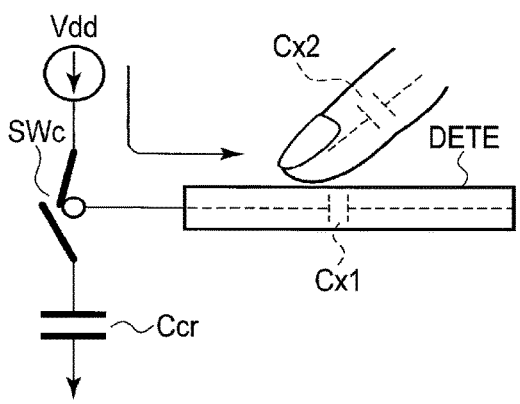
FIG. 4A is a further exemplary view showing the principle of the self-detection mode in the display device having the touch detection function according to the first embodiment.
Figure 4B:
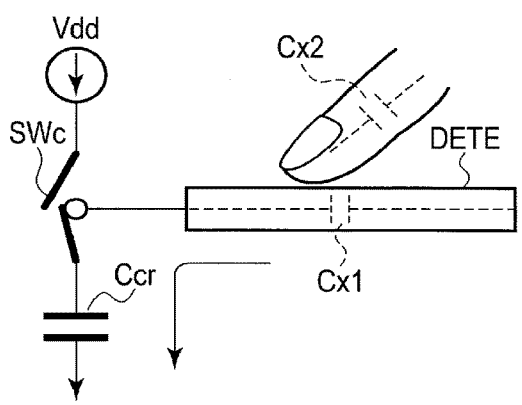
FIG. 4B is still another exemplary view showing the principle of the self-detection mode in the display device having the touch detection function according to the first embodiment.

FIGS. 4A and 4B show states in which the touch panel is touched by the user's finger. To be more specific, FIG. 4A shows a state in which by the control switch SWc, the power supply Vdd and the detection electrode DETE are connected to each other, and the detection electrode DETE is not connected to the capacitor Ccr. In this state, not only the detection electrode DETE having capacitance Cx1, but the user's finger, which is located close to the detection electrode DETE to thus have capacitance Cx2, is charged. FIG. 4B shows a state in which by the control switch SWc, the power supply Vdd and the detection electrode DETE are disconnected from each other, and the detection electrode DETE and the capacitor Ccr are connected to each other. In this state, the detection electrode DETE having capacitance Cx1 and the finger having capacitance Cx2 are both discharged through the capacitor Ccr.

It should be noted that a voltage variation characteristic of the capacitor Ccr at the time of discharge as shown in FIG. 3B (in the case where the finger does not touch the panel) is clearly different from that of the capacitor Ccr at the time of discharge as shown in FIG. 4B (in the case where the finger touches the panel), because of the presence of capacitance Cx2. Therefore, in the self-detection mode, it is determined whether an input operation by the finger or the like is performed or not, on the basis of the voltage variation characteristic of the capacitor Ccr, which varies in accordance with whether capacitance Cx2 is present or absent.

FIG. 5 is an exemplary view showing an example of a basic circuit for achieving the self-detection mode in the display device having the touch detection function according to the first embodiment.

The detection electrode DETE is connected to one of terminals of a capacitor Cr for voltage division and also to one of input terminals of the comparator COMP. The detection electrode DETE has a self-capacitance Cx. The other input terminal of the comparator COMP is connected to a supply terminal for a reference voltage Vref.

The other terminal of the capacitor Cr is connected to a power supply line of a voltage Vcc through switch SW1, and also connected to one of terminals of a capacitor Cc through a resistor Rc. The other terminal of the capacitor Cc is connected to a reference potential (for example, a ground potential).

Switch SW2 is connected to the reference potential and the above other terminal of the capacitor Cr, and switch SW3 is connected between the reference potential and the above one of the terminals of the capacitor Cr. Switches SW1, SW2 and SW3 and the comparator COMP are provided in the control circuit.

Next, the operation will be explained. Switch SW1 is closed (turned on) at regular intervals to enable the capacitor Cc to be charged. At the time of charging the capacitor Cc, switches SW2 and SW3 are opened (i.e., turned off). When the capacitor Cc has been charged, switches SW1, SW2 and SW3 are all turned off to cause charge in the capacitor Cc to be held therein.

Then, switches SW2 and SW3 are kept on for a given time period (whereas switch SW1 is kept off). As a result, the capacitors Cr and Cx are almost completely discharged, and the capacitor Cc is partially discharged through the resistor Rc.

Subsequently, switches SW1, SW2, and SW3 are all turned off. Consequently, charge in the capacitor Cc moves to the capacitors Cr and Cx. In the comparator COMP, a voltage Vx of the capacitor Cx is compared with a comparison voltage (or a threshold voltage) Vref.

FIG. 6 is an exemplary view showing an equivalent circuit in the case where switches SW1, SW2 and SW3 in the display device DSP having the touch detection function according to the first embodiment are turned on and off.

As shown in FIG. 6 showing the equivalent circuit, when switches SW1, SW2 and SW3 are all turned off, charge in the capacitor Cc moves to the capacitors Cr and Cx, and then variation of the voltage Vx of the capacitor Cx is repeatedly compared with the reference voltage Vref in the comparator COMP.

To be more specific, the following operation is repeatedly performed. Switches SW2 and SW3 are kept on for a given time period (whereas switch SW1 is kept off). As a result, the capacitors Cr and Cx are almost completely discharged, and the capacitor Cc is partially discharged through the resistor Rc. Then, switches SW1, SW2 and SW3 are all turned off. Consequently, charge in the capacitor Cc moves to the capacitors Cr and Cx.

The relationship between the voltages Vr, Vc and Vx and the capacitors Cr, Cc and Cx is expressed by the following equations (1)-(3):

$$Vc = Vr + Vx \quad (1)$$

$$Vr : Vx = (1/Cr) : (1/Cx) \quad (2)$$

$$Vx = (Cr/(Cr+Cx)) \times Vc \quad (3)$$

As described above, after the capacitor Cc is charged to the voltage Vc through switch SW1, when switches SW1 and SW2 are repeatedly turned on and off, the voltage Vc is gradually reduced, and the voltage Vx of the capacitor Cx is also reduced. This operation, i.e., an operation in which after the capacitor Cc is charged to the voltage Vc, switches SW2 and SW3 are repeatedly turned on and off, is continuously performed until the voltage Vx is decreased to be less than the predetermined threshold voltage Vref.

FIG. 7 is an exemplary view showing a variation waveform of the voltage Vc of the capacitor Cc and an output waveform of the comparator COMP in the display device DSP having the touch detection function according to the first embodiment. The horizontal and vertical axes of the coordinate system shown in FIG. 7 represent time and voltage, respectively.

When switch SW1 is closed (turned on), the capacitor Cc is charged in accordance with time constants of the capacitor Cc and the resistor Rc until the voltage Vc of the capacitor Cc reaches the voltage Vcc. Thereafter, switches SW1, SW2 and SW3 are all turned off, and charge in the capacitor Cc moves to the capacitor Cr and Cx. Then, the variation of the voltage Vx of the capacitor Cx is compared with the reference voltage Vref in the comparator COMP.

The characteristic of variation of the voltage Vc or the degree of conversion thereof changes in accordance with the total capacitance of the capacitor Cr and Cx. That is, the greater the total capacitance of the capacitor Cr and Cx, the larger the amount of charge which moves from the capacitor Cc to the capacitor Cr and Cx when switches SW2 and SW3 are turned off, and thus the greater the reduction of the voltage Vc. Also, the capacitance Cx varies in accordance with how the user's finger is in proximity to the detection electrode DETE.

Therefore, as shown in FIG. 7, in the case where the user' finger is far from the detection electrode DETE, the voltage Vc slowly varies as indicated by a characteristic VCP1, and in the case where the finger is close to the detection electrode DETE, the voltage rapidly varies as indicated by a characteristic VCP2. In the case where the finger is close to the detection electrode DETE, the rate of reduction of the voltage Vc is great, as compared with that in the case where the finger is far from the detection electrode DETE, since the capacitance of the finger is added to that of the capacitor Cc.

The comparator COMP compares a voltage Vr with the predetermined threshold voltage Vref in synchronization with repetitive switching between the on and off states of switches SW2 and SW3. Then, when the voltage Vr is greater than the predetermined threshold voltage Vref (Vr>Vref), the comparator COMP obtains output pulses. However, the comparator COMP stops output pulses when the voltage Vr becomes less than the predetermined threshold voltage Vref (Vr<Vref).

The output pluses of the comparator COMP are monitored by a measurement application or a measurement circuit not shown. That is, after the capacitor Cc is charged once, discharge is repeatedly carried out for short time with switches SW2 and SW3, and the voltage Vr is repeatedly measured. At this time, a time period (MP1 or MP2) in which an output of the comparator COMP is obtained may be measured, or the number of output pulses of the comparator COMP (the number of pulses which are output from charging of the capacitor Cc until the voltage Vr becomes less than a voltage Vth (Vr<Vth) may be measured.

In the case where the user's finger is far from the detection electrode DETE, the above time period is long, and in the case where the finger is close to the detection electrode DETE, the time period is short. Alternatively, in the case where the finger is far from the detection electrode DETE, the above number of output pulses of the comparator COMP is large, and in the case where the finger is close to the detection electrode DETE, the number of output pulses of the comparator COMP is small.

Therefore, based on the number of pulses detected, it is possible to determine how close the finger is to the flat surface of the touch panel. Also, detection electrodes included in the detection electrode DETE are arranged in a two-dimensional manner (matrix), and can thus detect a two-dimensional position of the finger on the flat surface of the touch panel.

As described above, it is detected whether the user's finger influences the detection electrode DETE or not. The time required for this detection is, for example, a few hundred of microseconds to the order of a few milliseconds.

[Mutual Detection Mode]

Figure 8:
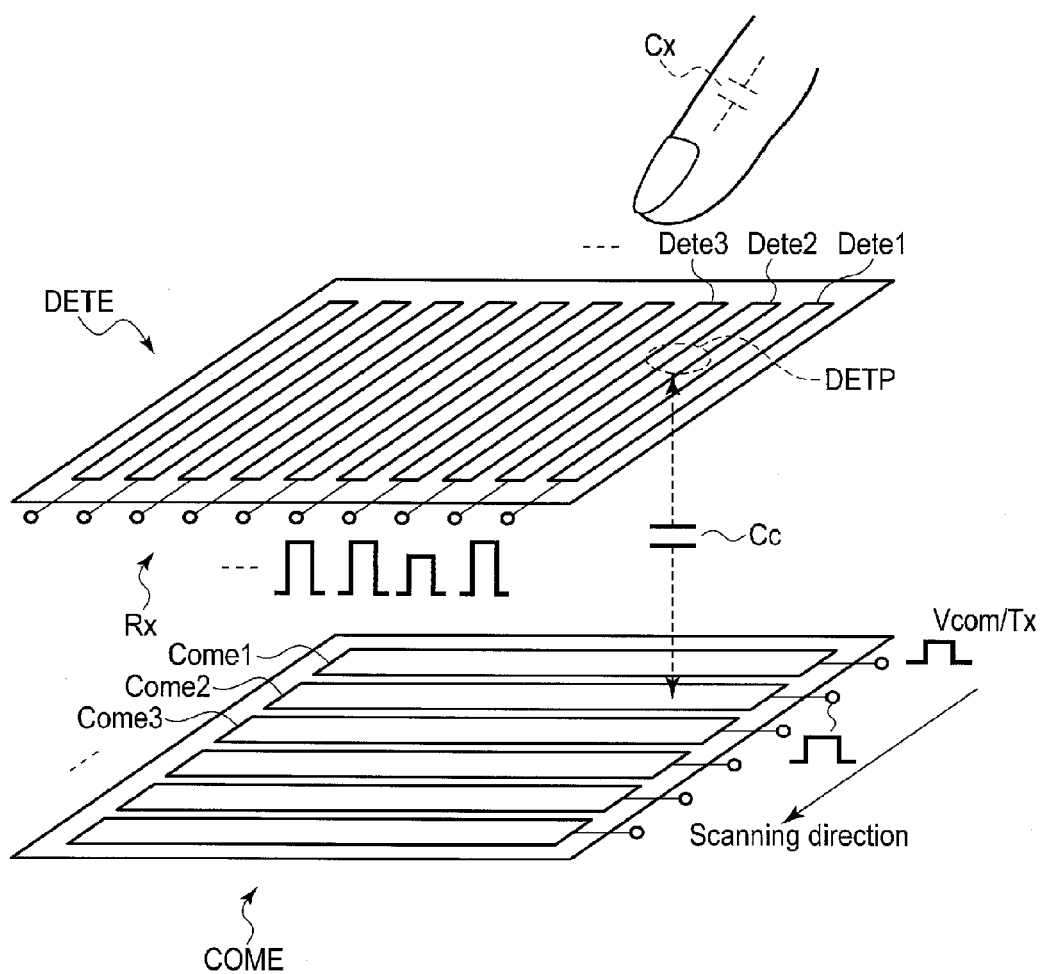
FIG. 8 is an exemplary view showing a representative basic structure of a mutual detection mode in the display device having the touch detection function according to the first embodiment.

FIG. 8 is an exemplary view showing a representative basic structure of a mutual detection mode in display device DSP having the touch detection function according to the first embodiment. The common electrode COME and the detection electrode DETE are used. The common electrode COME includes plural stripe common electrodes Come1, Come2, Come3, . . . arranged as stripes. The stripe common electrodes Come1, Come2, Come3, . . . are also arranged in a scanning (driving) direction (a Y direction or an X direction).

The detection electrode DETE includes plural stripe detection electrodes Dete1, Dete2, Dete3, . . . arranged as stripes (which are thinner than the common electrodes arranged as the stripes). The stripe detection electrodes Dete1, Dete2, Dete3 . . . are also arranged in a direction (the X direction or the Y direction) crossing the stripe common electrodes Come1, Come2, Come3, . . . .

The common electrode COME and the detection electrode DETE are spaced from each other. Thus, basically, capacitances Cc are present between the stripe common electrodes Come1, Come2, Come3, . . . and the stripe detection electrodes Dete1, Dete2, Dete3, . . . .

The stripe common electrodes Come1, Come2, Come3, . . . are scanned by drive pulses TSVCOM at predetermined intervals. In the case where the user's finger is close to the stripe detection electrode Dete2, when a drive pulse TSVCOM is supplied to the stripe common electrode Come2, a pulse is obtained from the stripe detection electrode Dete2, which is lower in level than pulses obtained from the other detection electrodes arranged as stripes. This is because a capacitance Cx is generated by the finger, and added to the capacitance Cc. In the mutual detection mode, the above pulse having a lower level can be handled as a position detection pulse.

The above capacitance Cx varies in accordance with whether the finger is close to or far from the detection electrode DETE. Thus, the level of the detection pulse also varies in accordance with whether the finger is close to or far from the detection electrode DETE. It is therefore possible to determine from the level of the detection pulse how close the finger is to the flat surface of the touch panel. Needless to say, the two-dimensional position of the finger on the flat surface of the touch panel can be detected based on an electrode driving timing of the drive pulse TSVCOM and an output timing of the detection pulse.

FIG. 9 is an exemplary view showing a configuration of a touch control device 100 which is related to a detection operation and a touch drive operation of the display device DSP having the touch detection function according to the first embodiment.

The touch control device 100 drives the common electrode COME and the detection electrode DETE, and processes signals from these electrodes to obtain touch position information. Then, the touch control device 100 outputs the obtained touch position detection information to a host processor HOST provided outside the display panel PNL.

The touch control device 100 is coupled to the common electrode COME and the detection electrode DETE by signal lines, and the touch control device 100 supplies and receives signals to and from the common electrode COME and the detection electrode DETE to control a self-detection operation and a mutual detection operation and receive a signal for obtaining touch position information. In the case where the self-detection operation is performed, although it is not limited, the detection electrode DETE is driven and the voltage of the detection electrode DETE is monitored, as shown in FIGS. 3A, 3B, 4A, 4B and 5, to thereby detect whether a closely situated external object is present or absent. Similarly, by driving the common electrode COME, the self-detection operation can be performed.

In the case where the mutual detection operation is performed, the common electrode COME is driven and the variation of the voltage of the detection electrode DETE is monitored to thereby detect whether a closely situated external object is present or absent. In order to switch the operation to be performed, from a display operation to the touch detection operation, a circuit to be connected to the common electrode COME is switched from a circuit for the display operation to a circuit for the touch detection operation by a switch not shown or the like. In order to switch the operation, from the self-detection operation to the mutual detection operation, for example, a circuit to be connected to the common electrode COME and the detection electrode DETE is switched from a circuit for performing the self-detection operation to a circuit for performing the mutual detection operation.

It should be noted that the following descriptions contain descriptions in which the common electrode COME is referred to as a transmission electrode Tx, and the detection electrode DETE is referred to as a reception electrode Rx. It should be noted that data is transmitted between the touch control device 100 and the host processor HOST, according to a communication system such as Inter-Integrated Circuit (I2C) or Serial Peripheral Interface (SPI), etc.

The touch control device 100 comprises a controller (μCom) 21, a touch driver (TP-IC) 22, a TX selector 23, a self-switch (Self-SW) 24.

The touch driver (TP-IC) 22 produces and outputs a touch drive signal, and also receives touch detection signals from the common electrode COME and the detection electrode DETE. The Tx selector 23, in the mutual detection mode, selects any of the stripe common electrodes Come1, Come2, Come3, ... arranged as stripes, to which a touch drive signal is to be transmitted. The self-switch (Self-SW) 24 switches a signal path between a signal path used in the self-detection operation and that used in the mutual detection operation. The self-switch (Self-SW) 24, during the self-detection operation, operates as an interface for transmitting a signal between the touch driver (TP-IC) 22 and the stripe common electrodes Come1, Come2, Come3, ... arranged as stripes. The self-switch (Self-SW) 24, during the mutual detection operation, operates as an interface for transmitting a drive signal from the touch driver (TP-IC) 22 to the stripe common electrodes Come1, Come2, Come3, ... arranged as stripes. A controller (μCom) 21 exercises a centralized control of the operation of the touch control device 100.

Figure 10:
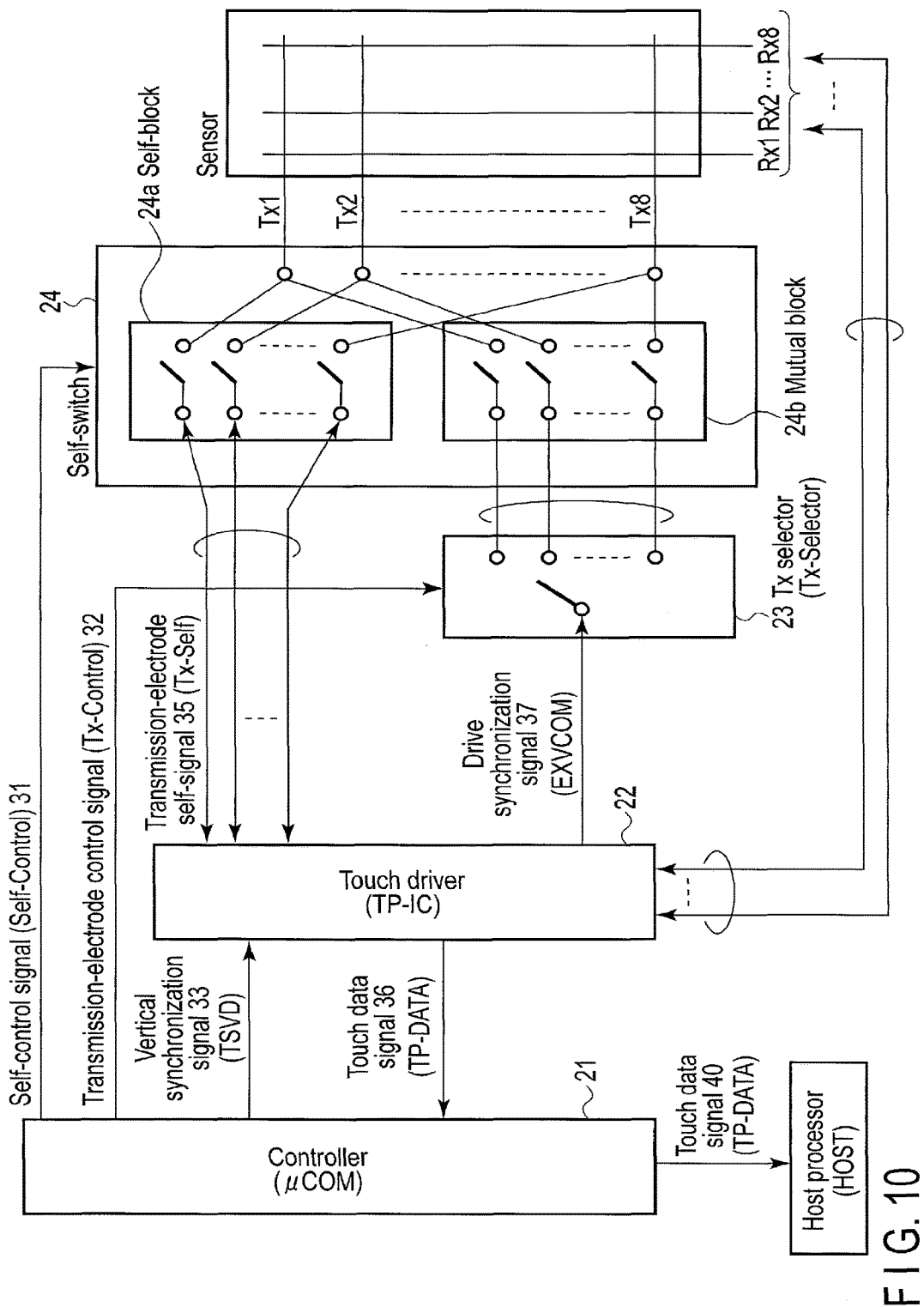
FIG. 10 is an exemplary view for explaining in detail a configuration of the touch control device of the display device having the touch detection function according to the first embodiment.

FIG. 10 is an exemplary view for explaining in detail a configuration of the touch control device 100 of the display device DSP having the touch detection function according to the first embodiment. It should be noted that explanations of elements explained above will be omitted as appropriate.

From the controller (μCom) 21, a self-control signal (Self-Control) 31 is output to the self-switch 24, a transmission-electrode control signal (Tx-Control) 32 is output to the Tx selector 23, a vertical synchronization signal (TSVD) 33 is output to the touch driver (TP-IC) 22, and a touch data signal (TP-DATA) 40 is output to the host processor HOST.

Between the touch driver (TP-IC) 22 and the self-switch 24, plural transmission-electrode self-signals (Tx-Self) 35 are transmitted; and from the touch driver (TP-IC) 22, a touch data signal (TP-DATA) 36 is output to the controller (μCom) 21, and a drive synchronization signal (EXVCOM) 37 is output to the Tx selector 23. Furthermore, transmission electrodes Tx1, Tx2, ... are electrically connected to the self-switch 24, and reception electrodes Rx1, Rx2, ... are electrically connected to the touch driver (TP-IC) 22.

In the self-switch 24, self-block 24a and mutual block 24b are provided. Each of transmission electrodes Tx1, Tx2, ... is dividedly connected to both self-block 24a and mutual block 24b. Self-block 24a is configured such that plural signal lines for use in sending and receiving plural transmission-electrode self-signals (Tx-Self) 35 are connected to transmission electrodes Tx1, Tx2, ... by switches. Mutual block 24b is configured such that transmission electrodes Tx1, Tx2, ... and signal lines from the Tx selector 23 are connected to each other by switches. It should be noted that the names "transmission electrode Tx" and "reception electrode Rx" are the names of electrodes which are used at the time of performing the mutual detection operation; however, since these electrodes are also used in the self-detection operation, the names "transmission electrode Tx" and "reception electrode Rx" are also applied to an explanation of those electrodes at the time of performing the self-detection operation. However, it should be noted that at the time of performing the self-detection operation, as explained above with reference to FIGS. 3A, 3B, 4A, 4B and 5, a drive signal is supplied to the transmission electrode Tx and/or the reception electrode Rx, and a variation of the signal thereof is detected.

The touch control operation of the touch control device 100 according to the first embodiment will be explained with reference to drawings. The touch control operation comprises the following five operations: (1) a transmission-electrode Tx self-detection operation; (2) a reception-electrode Rx self-detection operation; (3) a scan-position determination operation; (4) a mutual drive operation; and (5) a position information output operation.

FIG. 11A is a view for explaining the transmission-electrode Tx self-detection operation of the touch control device 100 according to the first embodiment.

When a single frame starts, in step S01, the controller (μCom) 21 sets a self-control signal (Self-Control) 31 to the on-state, and outputs it to the self-switch 24. As a result, the switches of self-block 24a operate, signal lines for sending and receiving plural transmission-electrode self-signals (Tx-Self) 35 are connected to transmission electrodes Tx1, Tx2, ... by the switches.

In step S02, the controller (μCom) 21 outputs a vertical synchronization signal (TSVD) 33 to the touch driver (TP-IC) 22. When the touch driver (TP-IC) 22 receives the vertical synchronization signal (TSVD) 33, in step S03, it executes a self-detection operation using the transmission electrodes Tx. As described above, transmission electrodes Tx1 Tx2, ... are electrically connected to the touch driver (TP-IC) 22. Therefore, the touch driver (TP-IC) 22 executes the self-detection operation on transmission electrodes Tx1 Tx2, ... in parallel at substantially the same timing.

In step S04, the touch driver (TP-IC) 22 produces a touch data signal (TP-DATA) 36 based on data acquired by the self-detection operation, and outputs it to the controller (μCom) 21. FIG. 11B shows the touch data signal (TP-DATA) 36. In the example shown in FIG. 11A, an object to be detected is present close to transmission electrode Tx3. Thus, the touch data signal (TP-DATA) 36 indicates that values of output data of transmission electrodes Tx2, Tx3 and Tx4 are greater than those of output data of the other transmission electrodes.

Figures 12A, 12B:
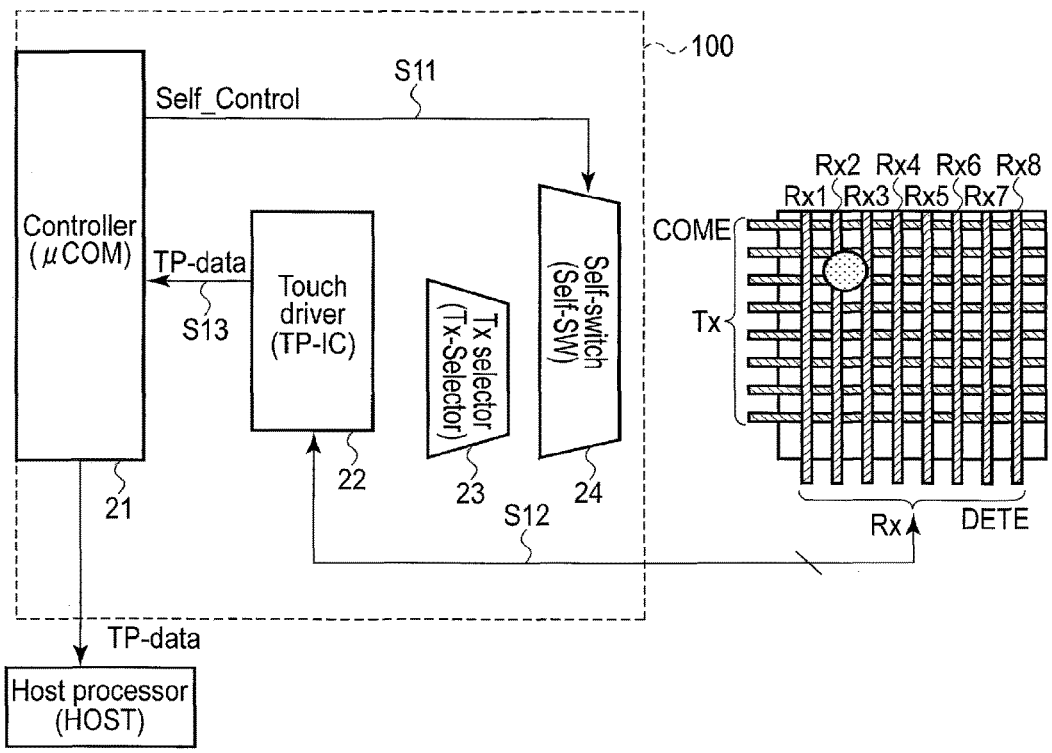
FIG. 12A is a further exemplary view for explaining the transmission-electrode self-detection operation of the touch control device according to the first embodiment.
FIG. 12B is still another exemplary view for explaining the transmission-electrode self-detection operation of the touch control device according to the first embodiment.

FIG. 12A is an exemplary view for explaining the reception-electrode Rx self-detection operation of the touch control device 100 according to the first embodiment.

Subsequent to the above transmission-electrode Tx self-detection operation, in step S11, the controller (μCom) 21 keeps the self-control signal (Self-Control) 31 in the on-state. This is intended to prevent the mutual detection operation from being executed. In step S12, the touch driver (TP-IC) 22 executes a self-detection operation using the reception electrodes Rx. As described above, reception electrodes Rx1, Rx2, ... are electrically connected to the touch driver (TP-IC) 22. Therefore, the touch driver (TP-IC) 22 executes the self-detection operation on reception electrodes Rx1, Rx2, ... in parallel at substantially the same timing.

In step S13, the touch driver (TP-IC) 22 produces a touch data signal (TP-DATA) 36 based on data acquired by the self-detection operation, and outputs it to the controller (μCom) 21. FIG. 12B shows the touch data signal (TP-DATA) 36. In the example shown in FIG. 12A, an object to be detected is present close to reception electrode Rx2. Thus, the touch data signal (TP-DATA) 36 indicates that values of output data of reception electrodes Rx1 to Rx4 are greater than those of output data of the other reception electrodes.

Figure 13:
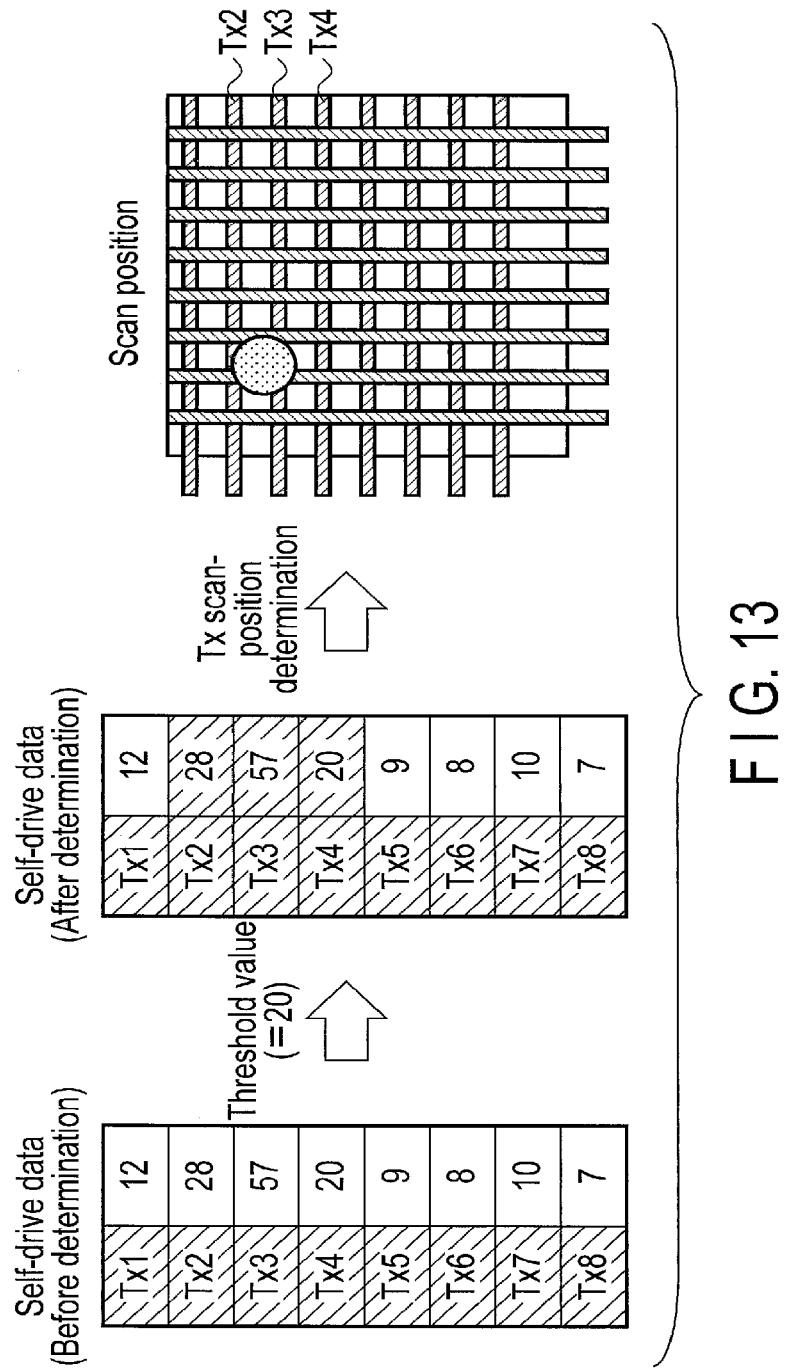
FIG. 13 is an exemplary view for explaining a scan-position determination operation of the touch control device according to the first embodiment.

FIG. 13 is an exemplary view for explaining a scan-position determination operation of the touch control device 100 according to the first embodiment.

The controller (μCom) 21 executes a scan-position determination operation using the touch data signal (TP-DATA) 36 transmitted from the touch driver (TP-IC) 22 in the transmission-electrode Tx self-detection operation. The controller (μCom) 21 specifies a transmission electrode or electrodes Tx whose output values are greater than or equal to a predetermined threshold value (20 in the example shown in FIG. 13). In the example shown in FIG. 13, transmission electrodes Tx2, Tx3 and Tx4 are determined as electrodes to be scanned.

FIG. 14 is a view for explaining the mutual drive operation of the touch control device 100 according to the first embodiment.

In step S21, the controller (μCom) 21 sets the self-control signal (Self-Control) 31 to the off-state, and outputs it to the self-switch 24. As a result, the switches of self-block 24a are turned off. On the other hand, in mutual block 24b, transmission electrodes Tx1, Tx2, . . . are connected to plural signal lines from the TX selector 23 by the switches.

In step S22, the controller (μCom) 21 outputs a transmission-electrode control signal (Tx-Control) 32 designating transmission electrode Tx2 to the Tx selector 23. Thereby, the Tx selector 23 connects its input terminal and its output terminal for transmission electrode Tx2 to each other. In step S23, the touch driver (TP-IC) 22 outputs a drive synchronization signal (EXVCOM) 37 to the TX selector 23. As a result, to transmission electrode Tx2, the drive synchronization signal (EXVCOM) 37 is input. In step S24, the touch driver (TP-IC) 22 acquires signals from reception electrodes Rx1, Rx2, . . . , and executes a mutual detection operation. Then, in step S25, the touch driver (TP-IC) 22 produces a touch data signal (TP-DATA) 36 based on data acquired by the mutual detection operation, and outputs it to the controller (μCom) 21.

Thereafter, with respect to transmission electrodes Tx3 and Tx4 determined as an area to be scanned, the operations of the above steps S22 to S25 are repeatedly carried out. By these operations, driving is executed in the partial mutual detection mode.

When the driving in the partial mutual detection mode ends, in step S30, the controller (μCom) 21 produces a new touch data signal (TP-DATA) 40 based on the touch data signal (TP-DATA) 36 transmitted from the touch driver (TP-IC) 22, and outputs it to the host processor HOST.

FIGS. 15A and 15B are views for explaining a position information output operation of the touch control device 100 according to the first embodiment.

FIG. 15A is an exemplary plan view showing the intensities of signals acquired from reception electrodes Rx1 to Rx8 with respect to transmission electrodes Tx2 to Tx4, based on a touch data signal (TP-DATA) 36 which is received by the controller (μCom) 21 by the driving in the partial mutual detection mode. In FIG. 15A, part indicated by a dotted circle indicates that the signal intensity is strong. The controller (μCom) 21 specifies an area where the object to be detected is present, based on signals acquired in the above manner.

As described above, in step S13 as shown in FIG. 12, the controller (μCom) 21 receives a touch data signal (TP-DATA) 36 acquired by the reception-electrode Rx self-detection operation. The controller (μCom) 21 specifies a reception electrode or electrodes Rx whose output values are greater than or equal to the threshold value (20 in the example), from the touch data signal (TP-DATA) 36. In the example shown in FIG. 15B, reception electrodes Rx1, Rx2, Rx3 and Rx4 are specified. The controller (μCom) 21, as shown in FIG. 15A, produces a new touch data signal (TP-DATA) 40 indicating data of an area surrounded by a broken line (data of reception electrodes Rx1 to Rx4 which is acquired with respect to transmission electrodes Tx2 to Tx4), and outputs it to the host processor HOST.

FIG. 16 is an exemplary time chart for explaining the touch control operation of the touch control device 100 according to the first embodiment.

At time T1, when a vertical synchronization signal (TSVD) 33 is input, the touch driver (TP-IC) 22 executes the transmission-electrode Tx self-detection operation. Then, at time T2, the touch driver (TP-IC) 22 executes the reception-electrode Rx self-detection operation. Detection data acquired by these detection operations is transmitted to the controller (μCom) 21. At time T3, the controller (μCom) 21 determines a transmission electrode Tx to be scanned in the mutual detection mode, based on detection data acquired by the transmission-electrode Tx self-detection operation.

At time T4, the controller (μCom) 21 and the touch driver (TP-IC) 22 execute a partial mutual detection operation in cooperation with each other. At time T5, the controller (μCom) 21 extracts part of data acquired by the partial mutual detection operation, based on the detection data acquired by the reception-electrode Rx self-detection operation, and outputs it to the host processor HOST.

It should be noted that the data to be output to the host processor HOST can be detected voltage signal data (raw data). In this case, "range data" indicating that the data to be output is part of data acquired in the partial mutual detection operation is added. The range data can indicate which transmission electrodes Tx are determined as a start and an end (for example, it can indicate transmission electrodes Tx2 and Tx4 as a start and an end), respectively, and also which reception electrodes Rx are determined as a start and an end (for example, it can indicate reception electrodes Rx1 and Rx4 as a start and an end), respectively. Furthermore, the data to be output to the host processor HOST may include data indicating a controlled state of the touch driver (TP-IC) 22, data indicating a controlled state of the display device, etc., in addition to the above touch data.

According to the first embodiment explained above, an area where the object to be detected is present is determined, and data on the area is output to the host processor HOST. It is therefore possible to reduce a touch processing time period including a data transfer time period, as compared with a conventional method (in which data of the entire touch sensor is output to the host processor HOST).

Also, since the data on the area where the object to be detected is present is acquired by executing driving in the partial mutual drive mode based on the transmission-electrode Tx self-detection operation, it is possible to reduce time required for acquiring the data.

Furthermore, since the amount of data to be output to the host processor HOST is reduced using data acquired by the reception-electrode Rx self-detection operation, it is possible to reduce the processing time period.

In addition, in the transmission-electrode Tx self-detection operation and the reception-electrode Rx self-detection operation, detection is executed by supplying drive signals at substantially the same timing for detection. Thus, the time required for processing is short, as compared with the case where detection is executed by sequentially supplying electrodes with drive signals.

Transmission electrodes Tx and reception electrodes Rx which are to be driven by the transmission-electrode Tx self-detection operation and the reception-electrode Rx self-detection operation can be set as electrodes which remain after thinning out transmission electrodes Tx and the reception electrodes Rx which are to be driven in the mutual drive operation. For example, in the self-detection operation, it can be set that driving is performed on every n-th electrode. Thereby, the above processing time period can be further reduced.

First Variation of First Embodiment

As a first variation of the first embodiment, it will be explained how the touch control operation of the touch control device 100 is performed in the case where objects to be detected are present in two positions. In the touch control operation, (1) the transmission-electrode Tx self-detection operation and (2) the reception-electrode Rx self-detection operation are the same as those in the first embodiment. It should be noted that structural elements identical to those in the first embodiment will be denoted by the same reference numbers as in the first embodiment, and their detailed explanations will be omitted.

Figure 17:
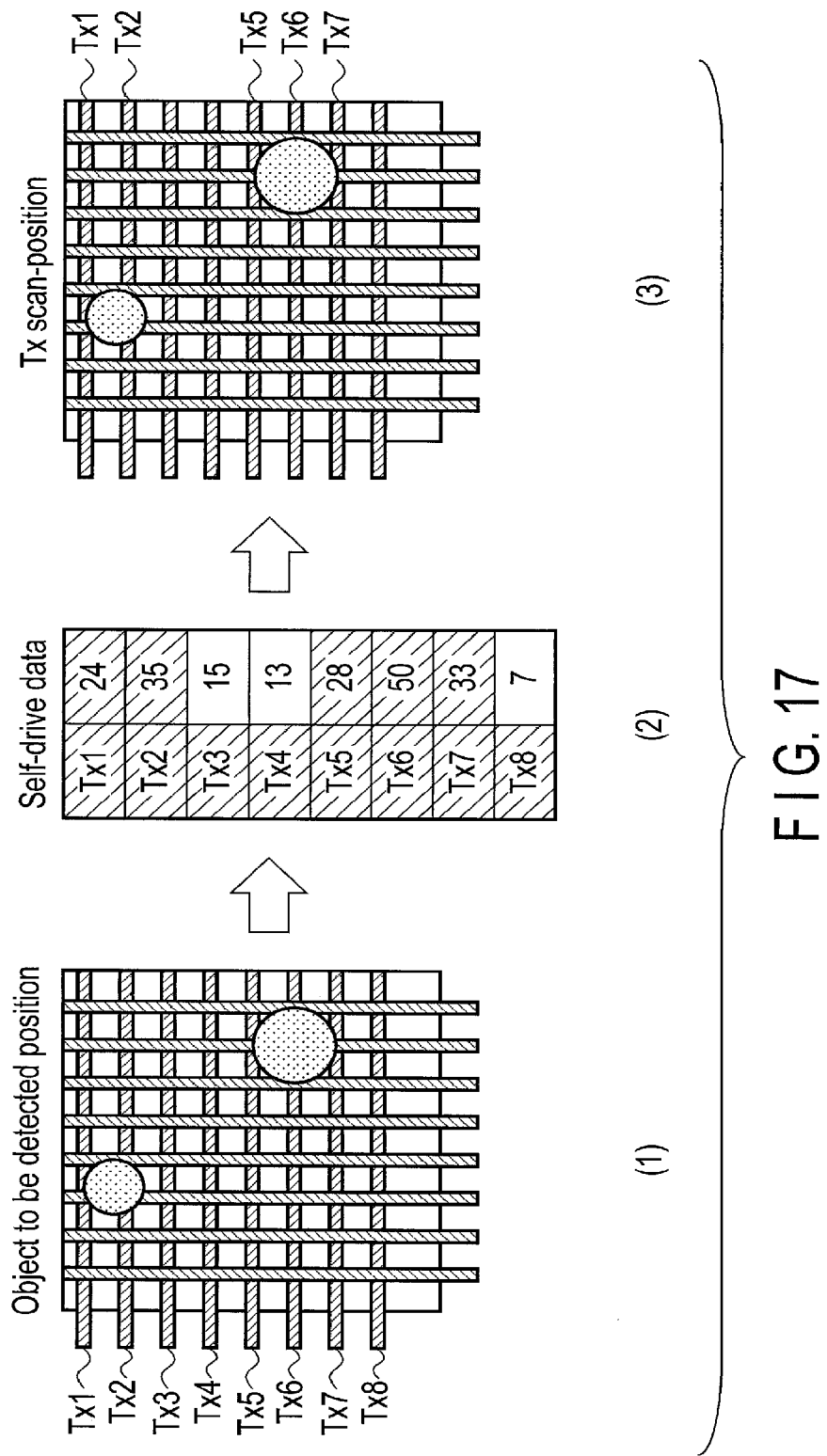
FIG. 17 is exemplary view for explaining a scan position determination operation of a touch control device according to a first variation of the first embodiment.

FIG. 17 is an exemplary view for explaining a scan position determination operation of the touch control device 100 according to the first variation of the first embodiment.

As shown in (1) in FIG. 17, objects to be detected are present in two positions (an area extending between transmission electrodes T1 and T2 and an area extending from transmission electrode T5 to transmission electrode T7). At this time, by the transmission-electrode Tx self-detection operation, such output data as shown in (2) in FIG. 17 is obtained. With respect to the output data, transmission electrodes Tx whose output values are greater than or equal to a predetermined threshold value (20 in this example) are specified. As a result, transmission electrodes Tx1, Tx2 and Tx5 to Tx7 are specified. Therefore, as shown in (3) in FIG. 17, driving of transmission electrodes Tx1 and Tx2 in the partial mutual detection mode and that of transmission electrodes Tx5 to Tx7 in the partial mutual detection mode are executed.

It should be noted that the positions of objects to be detected are not limited to two positions. That is, even if objects to be detected are present in three or more positions, they are processed in the same manner as in the case where objects to be detected are present in two positions. To be more specific, the following processing is executed: the transmission-electrode Tx self-detection operation is executed; groups of successive transmission electrodes Tx whose output values are greater than or equal to the predetermined threshold value are specified based on obtained detection data on the transmission electrodes Tx; and driving of each of the groups of transmission electrode Tx in the partial mutual detection mode is executed.

Figure 18:
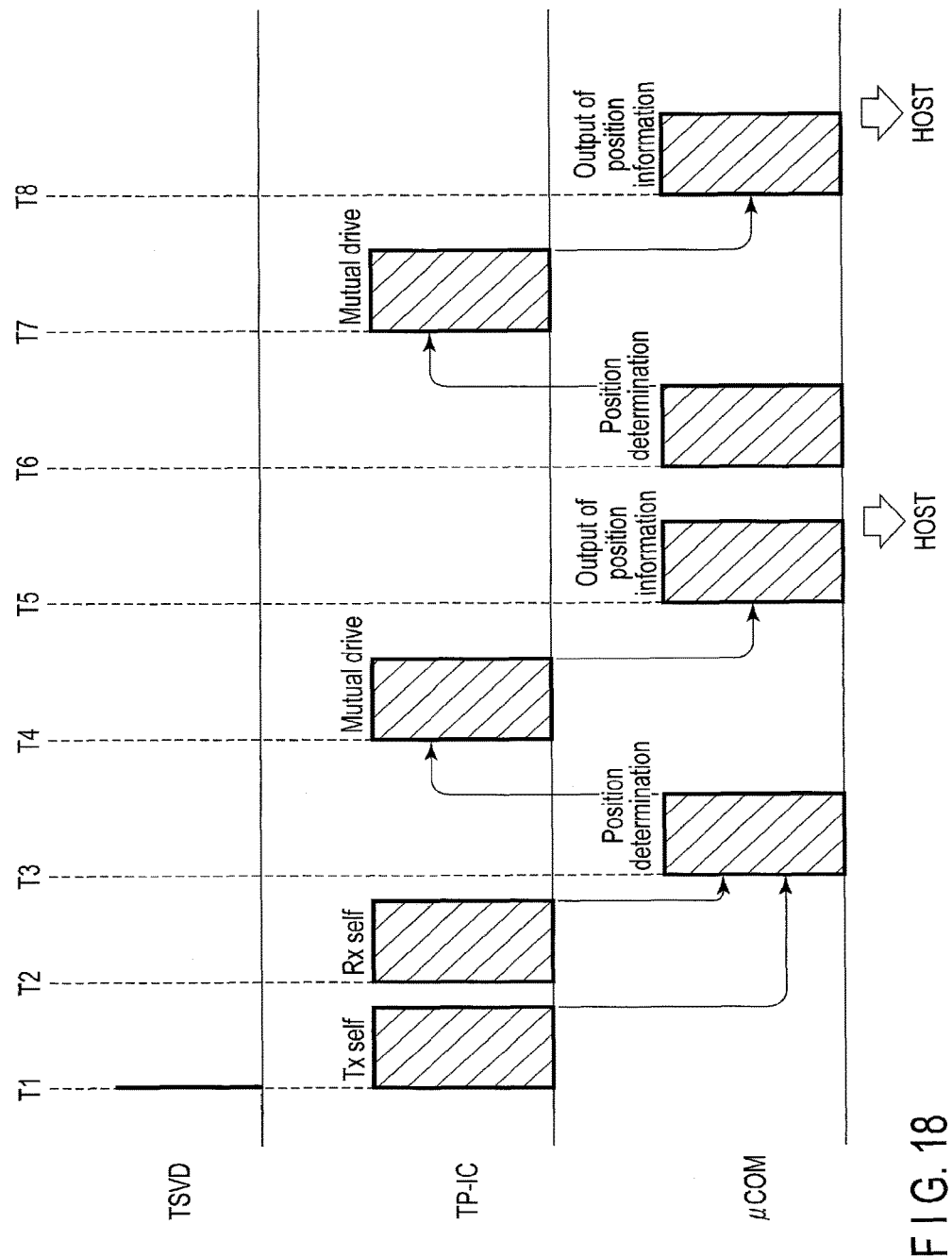
FIG. 18 is exemplary time chart showing a touch control operation of the touch control device according to the first variation of the first embodiment.

FIG. 18 is an exemplary time chart showing the touch control operation of the touch control device 100 according to the first variation of the first embodiment.

At time T1, when a vertical synchronization signal (TSVD) 33 is input, the touch driver (TP-IC) 22 executes the transmission-electrode Tx self-detection operation. Then, at time T2, the touch driver (TP-IC) 22 executes the reception-electrode Rx self-detection operation. Detection data obtained by these detection operations is transmitted to the controller (μCom) 21. At time T3, the controller (μCom) 21 classifies transmission electrodes Tx to be scanned in the mutual detection mode, into plural groups, based on detection data obtained by the transmission-electrode Tx self-detection operation.

The controller (μCom) 21 determines transmission electrodes Tx belonging to a group to be first scanned. At time T4, the controller (μCom) 21 and the touch driver (TP-IC) 22 execute the partial mutual detection operation in cooperation with each other. At time T5, the controller (μCom) 21 extracts part of data obtained by the partial mutual detection operation, based on the detection data obtained by the reception-electrode Rx self-detection operation, and outputs it to the host processor HOST. It should be noted that in the case where part of the data is extracted, candidate positions of objects to be detected are determined from the detection data obtained by the reception-electrode Rx self-detection operation, and with respect to the candidate positions, data obtained by the partial mutual detection operation is checked, to thereby specify the data to be extracted.

Then, at time T6, the controller (μCom) 21 determines transmission electrode Tx belonging to a group to be scanned in the mutual detection mode subsequently. At time T7, the controller (μCom) 21 and the touch driver (TP-IC) 22 execute the partial mutual detection operation in cooperation with each other. At time T8, the controller (μCom) 21 extracts part of data obtained by the partial mutual detection operation, based on the detection data obtained by the reception-electrode Rx self-detection operation, and outputs it to the host processor HOST. It should be noted that in the case where part of the data is extracted, candidate positions of objects to be detected are determined from the detection data obtained by the reception-electrode Rx self-detection operation, and with respect to the candidate positions, data obtained by the partial mutual detection operation is checked, to thereby specify the data to be extracted.

According to the first variation of the first embodiment explained above, even in the case of detecting the positions of plural objects to be detected, the touch processing period including the data transfer time period can be shortened, as compared with a conventional method (in which data on the entire touch sensor is output to a host processor HOST).

Second Variation of First Embodiment

In the second variation of the first embodiment, the time period in which the self-detection operation is executed is different from that of the first embodiment. It should be noted that structural elements identical to those in the first embodiment will be denoted by the same reference numbers as in the first embodiment, and their detailed explanations will be omitted.

In the first embodiment, as shown in, for example, FIG. 16, the transmission-electrode Tx self-detection operation and the reception-electrode Rx self-detection operation are executed in different time periods. On the other hand, in the second variation, these self-detection operations are executed independent of each other in the same time period. In the self-detection operations, the transmission electrodes Tx do not need to operate in synchronization with the reception electrodes Rx. Therefore, the transmission electrodes Tx and the reception electrodes Rx can be given drive signals independently of each other. Thus, the touch driver (TP-IC) 22 can perform an operation in a time-sharing manner.

According to the second variation of the first embodiment as described above, the time required for the transmission-electrode Tx self-detection operation and the reception-electrode Rx self-detection operation can be further reduced.

Second Embodiment

In the second embodiment, the method of the partial mutual detection operation is different from that of the first embodiment. It should be noted that structural elements identical to those in the first embodiment will be denoted by the same reference numbers as in the first embodiment, and their detailed explanations will be omitted.

In step S21 as shown in FIG. 14, the controller (μCom) 21 sets the self-control signal (Self-Control) 31 to the off-state, and then outputs it to the self-switch 24. As a result, the switch of self-block 24a is turned off. On the other hand, in mutual block 24b, transmission electrodes Tx1, Tx2, . . . are connected to plural signal lines from the TX selector 23 through the switch.

At step S22, the controller (μCom) 21 outputs a transmission-electrode control signal (Tx-control) 32 designating transmission electrode Tx2 to the Tx selector 23. Thereby, the Tx selector 23 connects its input terminal and its output terminal for transmission electrode Tx2 to each other. In step S23, the touch driver (TP-IC) 22 outputs a drive synchronization signal (EXVCOM) 37 to the TX selector 23. As a result, to transmission electrode Tx2, a drive synchronization signal (EXVCOM) 37 is input.

It should be noted that in step S13 as shown in FIG. 12A, the controller (μCom) 21 receives a touch data signal (TP-DATA) 36 acquired by the reception-electrode Rx self-detection operation. The controller (μCom) 21 specifies a reception electrode or electrodes Rx whose output values are greater than or equal to the predetermined threshold value (20 in the example), from the touch data signal (TP-DATA) 36. In the example shown in FIG. 15B, reception electrodes Rx1, Rx2, Rx3 and Rx4 are specified. The controller (μCom) 21 designates specified reception electrodes Rx1, Rx2, Rx3 and Rx4 for the touch driver (TP-IC) 22.

In step S24, the touch driver (TP-IC) 22 executes a partial mutual detection operation to acquire signals from reception electrodes Rx1, Rx2, Rx3 and Rx4 designated by the controller (μCom) 21. Then, the touch driver (TP-IC) 22 outputs a touch data signal (TP-DATA) 36 detected from the data acquired by the mutual detection operation to the controller (μCom) 21.

Thereafter, with respect to transmission electrodes Tx3 and Tx4 determined as electrodes to be scanned, the operations of steps S22 to S25 described above are repeatedly executed. By these operations, driving in the partial mutual detection mode is executed.

According to the above second embodiment, in addition to the advantages of the first embodiment, it is possible to obtain an advantage in which the time required for the partial mutual detection operation can be shortened.

Third Embodiment

In the third embodiment, the reception-electrode Rx self-detection operation is not executed. In this regard, the third embodiment is different from the first embodiment. It should be noted that structural elements identical to those in the first embodiment will be denoted by the same reference numbers as in the first embodiment, and their detailed explanations will be omitted.

In the third embodiment, the touch control operation comprises the following four operations: (1) a transmission-electrode Tx self-detection operation; (2) a scan-position determination operation; (3) a mutual drive operation; and (4) a position information output operation. The above operations (1) to (3), i.e., the transmission-electrode Tx self-detection operation, the scan-position determination operation and the mutual drive operation, are the same as those of the first embodiment, and their detailed explanations will thus be omitted.

FIG. 15A is a plan view showing the intensities of signals acquired from reception electrodes Rx1 to Rx8 with respect to transmission electrodes Tx2 to Tx4, based on a touch data signal (TP-DATA) 36 which is obtained and received by the controller (μCom) 21 by the driving in the partial mutual detection mode. In FIG. 15A, part shown by a black circle indicates that the signal intensity is strong. The controller (μCom) 21 determines a given area where the object to be detected is present, from signals obtained in the above manner.

As described above, in step S25 as shown in FIG. 14, the controller (μCom) 21 receives a touch data signal (TP-DATA) 36 acquired by the driving in the partial mutual detection mode. The controller (μCom) 21 specifies a reception electrode or electrodes Rx whose output values are greater than or equal to the predetermined threshold value (20 in the example), from the touch data signal (TP-DATA) 36. In the third embodiment, reception electrodes Rx1, Rx2, Rx3 and Rx4 are specified. The controller (μCom) 21, as shown in FIG. 15A, produces a new touch data signal (TP-DATA) 40 indicating data on an area surrounded by a broken line, and outputs it to the host processor HOST.

According to the third embodiment as described above, in addition to the advantages of the first embodiment, it is possible to obtain an advantage in which time which would be required for the reception-electrode Rx self-detection operation can be saved.

Fourth Embodiment

In the fourth embodiment, the transmission-electrode Tx self-detection operation and the reception-electrode Rx self-detection operation explained above with respect to the first to third embodiments are interchanged with each other. Therefore, methods for driving the transmission electrodes Tx and the reception electrodes Rx in the partial mutual detection operation are also interchanged with each other.

This feature will be explained with reference to, for example, the time chart of FIG. 16 for explaining the touch control operation of the touch control device 100. In the fourth embodiment, unlike the order shown in FIG. 16, the reception-electrode Rx self-detection operation is first executed, and the transmission-electrode Tx self-detection operation is then executed. Detection data obtained by these detection operations is transmitted to the controller (μCom) 21. At time T3, the controller (μCom) 21 determines a reception electrode or electrodes Rx to be scanned, based on detection data acquired by the reception-electrode Rx self-detection operation.

At time T4, the controller (μCom) 21 and the touch driver (TP-IC) 22 execute the partial mutual detection operation in cooperation with each other. In the partial mutual detection operation of the fourth embodiment, the touch driver (TP-IC) 22 inputs a drive synchronization signal (EXVCOM) 37 to all transmission electrodes Tx1 Tx2, . . . , Tx8, and acquires signals from some reception electrodes Rx determined as ones to detected. At time T5, the controller (μCom) 21 extracts part of data acquired by the partial mutual detection operation, based on detection data acquired by the transmission-electrode Tx self-detection operation, and outputs it to the host processor HOST.

The above touch control operation will be explained with reference to FIG. 10, which shows the configuration of the touch control device 100. The reception electrodes Rx1, Rx2, . . . are electrically connected to the touch driver (TP-IC) 22. Therefore, the touch driver (TP-IC) 22 executes the self-detection operation on reception electrodes Rx1, Rx2, . . . in parallel at substantially the same timing. Furthermore, the transmission electrodes Tx1 Tx2, . . . are electrically connected to the touch driver (TP-IC) 22 through the self-switch 24. Therefore, the touch driver (TP-IC) 22 can execute the self-detection operation on transmission electrodes Tx1 Tx2, . . . in parallel at substantially the same timing.

Therefore, in the fourth embodiment also, the touch control operation can be executed using the touch control device 100 the configuration of which is shown in FIG. 10.

It should be noted that also in the method for detecting the positions of objects to be detected, as shown in FIG. 18, the transmission-electrode Tx self-detection operation and the reception-electrode Rx self-detection operation are interchanged with each other. Therefore, the methods for driving the transmission electrodes Tx and the reception electrodes Rx are interchanged with each other. However, the fourth embodiment can also obtain the same advantages as described above.

Also, it should be noted that with respect to each of the above embodiments, the reception-electrode Rx self-detection operation is explained above as the reception-electrode Rx self-detection operation in the case where signals are transmitted between the touch driver (TP-IC) 22 and the detection electrodes DETE; however, it is possible that in the self-switch 24, a switch is further provided, the switch effects switching of connection between the touch driver (TP-IC) 22 and the detection electrode DETE, and signals are transmitted therebetween through the self-switch 24 as in the transmission-electrode Tx self-detection operation.

Also, in the TX selector 23, a circuit can be provided. The circuit changes a signal connection such that a drive synchronization signal (EXVCOM) 37 is supplied to one of the reception electrodes Rx which is designated by the controller 21.

It should be noted that although the above embodiments are explained above by referring to an in-cell touch control device, it is obvious that they can also be applied to an out-cell touch control device. In the case where they are applied to the out-cell touch control device, a controller (for example, a central processing unit [CPU]) is provided in place of the touch driver (TP-IC) 22, and is configured to control the touch drive operation. In the out-cell touch control device, the touch drive operation can be executed independent of the display operation, and the time required for touch processing time period can thus be shortened, and the controller can perform the touch detection with a high accuracy.

It should be noted that the embodiments are not limited to such a panel structure as described above.

The embodiments are also explained above by referring to by way of a panel using a liquid crystal which is of a lateral electric field type such as an in-plane switching (IPS) mode or a fringe-field switching (FFS) mode; however, the panel of each of the embodiments is not limited to such a panel. That is, the embodiments can be applied to a panel using a liquid crystal which is of a vertical electric field type such as a twisted nematic (TN) mode or an optically compensated bend (OCB) mode.

Also, with respect to the embodiments, although the display device having the touch detection function is explained above by referring to by way of example a so-called in-cell display device, the embodiments can also be applied to a so-called on-cell display device.

All display devices which can be obtained and put to practical use by a person with ordinary skill in the art, as appropriate, by modifying the design of the display device described above with respect to the embodiments also fall within the scope of the present invention, as long as they have the subject matter of the invention.

A person with ordinary skill in the art would conceive various changes and modifications of the present invention within the scope of the concept of the invention, and such changes and modifications are encompassed by the scope of the present invention. For example, if a person with ordinary skill in the art adds/deletes/alters a structural element or design to/from/in the above embodiments, or adds/deletes/ alters a step or a condition to/from/in the above embodiment, as long as they fall within the scope and spirit of the present invention, such addition, deletion, and altercation are encompassed by the scope of the present invention.

Furthermore, regarding the embodiments, any other advantage which could be obviously derived from the descriptions of the specification relating to the embodiments or arbitrarily conceived by a person with ordinary skill in the art is naturally considered achievable by the present invention.

Various inventions can be made by combining as appropriate a plurality of structural elements disclosed with respect to the embodiments. For example, some structural elements may be deleted from all the structural elements described with respect to the embodiments. Furthermore, structural elements of any of the embodiments may be combined with structural elements of another embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A touch control device which drives a touch sensor to collect data indicating a position of at least one object to be detected, which is located on or close to the touch sensor, and outputs the data to an external device, the touch sensor comprising plural first electrodes arranged to extend in a first direction, and plural second electrodes arranged to extend in a second direction crossing the first direction in which the first electrodes extend, the touch control device comprising:
   a controller which exerts a centralized control of the touch control device;
   a touch driver which is electrically connected to the first and second electrodes, applies a self-detection mode and a partial mutual detection mode to collect data indicating the position of the object on or close to the touch sensor, and outputs the data to the controller;
   a selector which switches, in a case of driving the first and second electrodes in the partial mutual detection mode, a signal connection to cause a drive synchronization signal from the touch driver to be supplied to one of the first electrodes which is designated by the controller; and
   a self switch which switches, in a case of driving the first electrodes in the self-detection mode, the signal connection to cause the first electrodes and the touch driver to be signal-connected to each other; and switches, in a case of driving the first and second electrodes in the partial mutual detection mode, the signal connection to cause a drive synchronization signal from the selector to be supplied to the one of the first electrodes.

2. The touch control device according to claim 1, wherein the controller outputs two signals for causing the signal connection to be switched, one of the two signals being supplied to the self switch, the other being supplied to the selector.

3. A display device having a touch detection function, comprising:
   a touch control device which drives a touch sensor to collect data indicating a position of at least one object to be detected, which is located on or close to the touch sensor, and outputs the data to an external device, the touch sensor comprising plural first electrodes arranged to extend in a first direction, and plural second electrodes arranged to extend in a second direction crossing the first direction in which the first electrodes extend; and display pixels which make a display based on an image signal and a display drive signal, wherein the touch control device comprises:

a controller which exerts a centralized control of the touch control device;

a touch driver which is electrically connected to the first and second electrodes, applies a self-detection mode and a partial mutual detection mode to collect data indicating the position of the object on or close to the touch sensor, and outputs the data to the controller;

a selector which switches, in a case of driving the first and second electrodes in the partial mutual detection mode, a signal connection to cause a drive synchronization signal from the touch driver to be supplied to one of the first electrodes which is designated by the controller; and a self switch which switches, in a case of driving the first electrodes in the self-detection mode, the signal connection to cause the first electrodes and the touch driver to be signal-connected to each other; and switches, in a case of driving the first and second electrodes in the partial mutual detection mode, the signal connection to cause a drive synchronization signal from the selector to be supplied to the one of the first electrodes.

4. The display device having the touch detection function according to claim 3, wherein the touch control device is of an in-cell type.

5. The display device having the touch detection function according to claim 3, wherein the controller outputs two signals for causing the signal connection to be switched, one of the two signals being supplied to the self switch, the other being supplied to the selector.

6. The display device having the touch detection function according to claim 5, wherein the touch control device is of an in-cell type.

* * * * *